(12) United States Patent
Mallette et al.

(10) Patent No.: US 6,942,051 B2
(45) Date of Patent: Sep. 13, 2005

(54) FRONT SUSPENSION WITH THREE BALL JOINTS FOR A VEHICLE

(75) Inventors: Bertrand Mallette, Rock-Forest (CA);
Bruno Girouard, Montreal (CA);
Berthold Fecteau, Richmond (CA);
Mario Côté, Bedford (CA)

(73) Assignee: Bombardier Recreational Products, Inc., Valcourt (CA)

( * ) Notice: Subject to any disclaimer, the term of this patent is extended or adjusted under 35 U.S.C. 154(b) by 0 days.

(21) Appl. No.: 11/041,777

(22) Filed: Jan. 22, 2005

(65) Prior Publication Data
US 2005/0121244 A1 Jun. 9, 2005

Related U.S. Application Data

(60) Continuation of application No. 10/634,911, filed on Aug. 6, 2003, now Pat. No. 6,866,110, which is a division of application No. 09/877,214, filed on Jun. 11, 2001, now Pat. No. 6,655,487, which is a continuation-in-part of application No. 09/472,133, filed on Dec. 23, 1999, now abandoned.

(60) Provisional application No. 60/230,432, filed on Sep. 6, 2000, provisional application No. 60/237,384, filed on Oct. 4, 2000, provisional application No. 60/251,263, filed on Dec. 5, 2000.

(30) Foreign Application Priority Data

Dec. 23, 1998 (CA) .................................... 2256944

(51) Int. Cl.[7] .............................................. B60G 1/00
(52) U.S. Cl. ................................ 180/183; 280/124.134
(58) Field of Search ............................... 180/182–186, 180/190, 191; 280/21.1, 22, 16, 17, 14.26, 280/124.128, 124.148, 124.145, 124.13, 280/124.127, 124.134, 124.166

(56) References Cited

U.S. PATENT DOCUMENTS

| | | | |
|---|---|---|---|
| 3,583,506 A | 6/1971 | Preble |
| 3,583,507 A | 6/1971 | Tratwein |
| 3,622,196 A | 11/1971 | Sarra |
| 3,627,073 A | 12/1971 | Grimm |
| 3,692,130 A | 9/1972 | Stacy, Jr. |
| 3,827,516 A | 8/1974 | Lucia |
| 3,883,152 A | 5/1975 | De Carbon |
| 3,884,152 A | 5/1975 | Emerlat |
| 3,884,314 A | 5/1975 | Callaway |
| 3,912,030 A | 10/1975 | Payne |

(Continued)

FOREIGN PATENT DOCUMENTS

CA    2251769    8/1995

OTHER PUBLICATIONS

Magazine Article: Dirt Wheels/Jan. 1991.

(Continued)

Primary Examiner—Tony Winner
(74) Attorney, Agent, or Firm—BRP Legal Services

(57) ABSTRACT

A suspension for a vehicle includes an upper A-arm and a lower A-arm. A leg with an axis is rotatably connected to both the upper A-arm and the lower A-arm. A mechanical link is rotatably connected to the leg so that movement of the mechanical link applies rotational force to the leg to cause the leg to rotate about the axis.

11 Claims, 40 Drawing Sheets

U.S. PATENT DOCUMENTS

| | | |
|---|---|---|
| 3,931,862 A | 1/1976 | Cote |
| 3,981,373 A | 9/1976 | Irvine |
| 4,204,581 A | 5/1980 | Husted |
| 4,204,582 A | 5/1980 | van Soest |
| 4,361,339 A | 11/1982 | Kobayashi |
| 4,502,560 A | 3/1985 | Hisatomi |
| 4,613,006 A | 9/1986 | Moss et al. |
| 4,633,964 A | 1/1987 | Boyer et al. |
| 4,699,229 A | 10/1987 | Hirose et al. |
| 4,848,503 A | 7/1989 | Yesui et al. |
| 5,029,664 A | 7/1991 | Zulawski |
| 5,038,882 A | 8/1991 | Zulawski |
| 5,357,775 A | 10/1994 | Nakazawa et al. |
| 5,370,198 A | 12/1994 | Karpik |
| 5,474,146 A | 12/1995 | Yoshioka et al. |
| 5,503,242 A | 4/1996 | Jeffers |
| 5,564,517 A | 10/1996 | Levasseur |
| 5,660,245 A | 8/1997 | Marier et al. |
| 5,860,486 A | 1/1999 | Boivin et al. |
| 5,944,133 A | 8/1999 | Eto |
| 5,992,552 A | 11/1999 | Eto |
| 6,009,966 A | 1/2000 | Olson et al. |
| 6,022,035 A | 2/2000 | Habich |
| 6,234,263 B1 | 5/2001 | Boivin et al. |
| 6,328,124 B1 | 12/2001 | Olson et al. |
| 6,343,666 B1 | 2/2002 | Olson et al. |
| 6,357,543 B1 | 3/2002 | Karpik |
| 6,474,662 B1 | 11/2002 | Cormican |

OTHER PUBLICATIONS

Brochure of Yamaha Snow Scout: Motoneige Quebec, 1987, vol. 13, No. 1, Canada.

Brochure of Yamaha Snow Scout: Snowmobile Brochure Business, 3rd Annual.

Magazine Supertrax/Jan. 1999.

Snow Tech, Article "Special Report" Redline Snowmobiles, pp. 28-31, Spring 1999.

Motoneige Quebec, Nov. 1999, pp. 1 (front cover). 6, 31 and 58, vol. 25-No. 3.

Creations J.P.L. Inc., Advertisement (Advertising Seat Design).

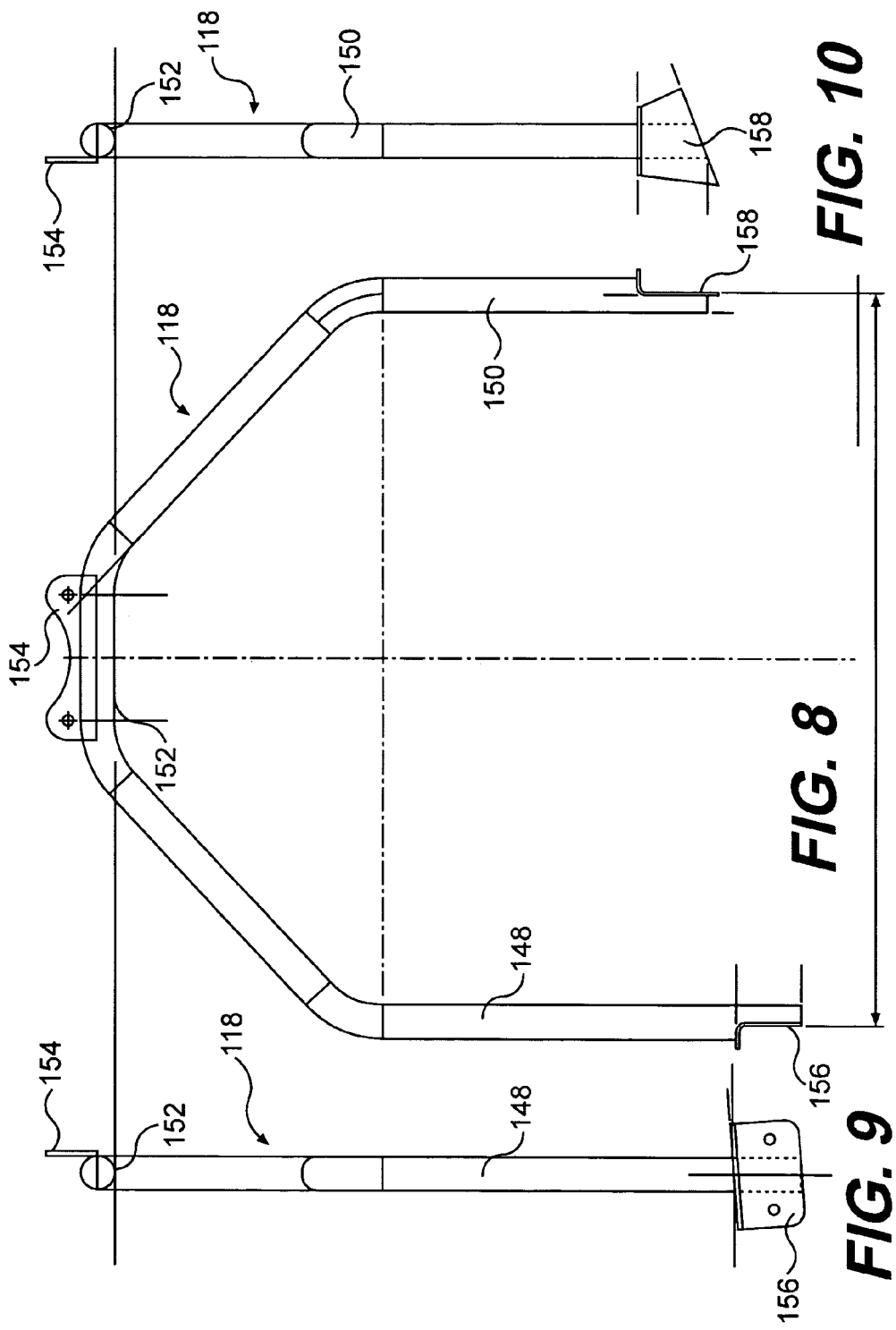

FRONT SUSPENSION WITH THREE BALL JOINTS FOR A VEHICLE

This application is a Continuation of U.S. patent application Ser. No. 10/634,911, filed on Aug. 6, 2003, now U.S. Pat. No. 6,866,110 which is itself a Divisional application of Ser. No. 09/877,214, now U.S. Pat. No. 6,655,487 filed on Jun. 11, 2001. U.S. Pat. No. 6,655,487 is a Continuation-In-Part of Ser. No. 09/472,133 filed on Dec. 23, 1999, now abandoned and claims priority to 60/230,432 filed on Sep. 6, 2000, 60/237,384, filed on Oct. 4, 2000, 60/251,263, filed on Dec. 5, 2000, and Canadian Application No. 2,256,944 filed on Dec. 23, 1998. All aforementioned applications and patents are incorporated herein by reference. This application also incorporates by reference U.S. patent application Ser. No. 09/472,134, entitled "SNOWMOBILE," which was filed on Dec. 23, 1999.

1. Field of the Invention

The present invention concerns generally concerns the construction of vehicles such as snowmobiles, all terrain vehicles ("ATVs"), and other similar vehicles. More specifically, the present invention concerns the construction of a front suspension with three-ball joints that are connected to a support leg for the vehicle.

2. Description of Related Art and General Background

Snowmobiles, ATVs, wheeled vehicles, and other related vehicles (hereinafter, "recreational vehicles," although the appellation should not be construed to be limited only to the vehicles or type of vehicles described herein) often function under similar operating conditions. Despite this, snowmobiles, ATVs, wheeled vehicles, and other recreational vehicles do not share a common design approach or a commonality of components. This is due, in large part, to the different stresses and strains (mainly at the extremes) that the different vehicles experience during routine operation.

As a general rule, the prior art includes few, if any, examples of a common design approach to ATVs, wheeled vehicles, and snowmobiles. Primarily, this appears to be due to the fact that these vehicles were designed traditionally from radically different starting points. For example, there has not been a common design approach to the front suspensions that are incorporated into snowmobiles, ATVs, and other wheeled vehicles even though there are common design parameters for each of these types of vehicles.

In the case of snowmobiles, two front suspensions are well known in the art. The first is typically referred to as a "trailing arm suspension" and is commonly found on snowmobiles manufactured by Bombardier Inc. of Montreal, Quebec, Canada. The second is known as a double A-arm suspension and is typically found on snowmobiles manufactured by Arctic Cat of Thief River Falls, Minn., USA.

A prior art trailing arm front suspension is generally depicted in FIGS. 1, 3, and 36. As illustrated in detail in FIG. 36, a trailing arm suspension 442 includes a trailing arm 444 (which is also referred to as a swing arm). Trailing arm 444 connects between a pivot 446, which connects to engine cradle 56, and a front leg 448. Front leg 448 connects ski 20 to engine cradle 56. A shock absorber 450 connects between engine cradle 56 and trailing arm 444 to dampen the forces associated with the travel of snowmobile 12 over uneven terrain. Steering control of snowmobile 12 is provided by a mechanical link between skis 20 and handlebars 82.

A typical double A-arm suspension 452 is illustrated generally in FIGS. 37–40. The illustration of double A-arm suspension 452 that is shown in FIGS. 37–38 was reproduced from U.S. Pat. No. 5,664,649, which purports on its face to be assigned to Arctic Cat. As shown, double A-arm suspension 452 includes an upper A-arm 454 and a lower A-arm 456. Both A-arms 456, 454 are connected to front leg 458 and permit front leg 458 to move vertically as snowmobile 460 travels over uneven terrain. A shock absorber 462, which is connected between the body of snowmobile 460 and lower A-arm 456, dampens the forces applied to skis 464 as snowmobile 460 travels over the ground. Alternatively, it is known to connect shock absorber 450 directly to front leg 458, as illustrated in FIG. 39.

Since upper and lower A-arms 454, 456 are connected to front leg 458 through pins (or bolts) 466, 468, front leg 458 cannot rotate around its vertical centerline. Therefore, front leg 208 cannot be used to turn ski 464. Instead, a steering shaft 470 extends through a hole 472 bored through front leg 458. Steering shaft 470 is connected to handlebars 474 through a mechanical linkage 476. As handlebars 474 are rotated, steering shaft 470 rotates in the direction of the arrow 478 shown in FIG. 40. Since steering shaft 470 is connected to ski 464 through a pin or bolt 480, as steering shaft 470 rotates, ski 464 turns.

While both of these front suspensions provide adequate control and steering of the respective snowmobiles on which they are installed, neither provides a simple construction for a front suspension.

In the case of the trailing arm suspension, the trailing arm 444 adds additional components to the system. The additional components add to the manufacturing cost and to the complexity of snowmobile 12. Moreover, the additional components increase the overall weight of snowmobile 12.

In the case of double A-arm suspension 452, the same is true. In this case, however, the complexity of the system and the weight of the components are particularly pronounced. For example, it is estimated that the weight of front leg 458 is about twice that of front leg 448 of trailing arm suspension 442. This is attributable to the individual components that comprise front leg 458, which is usually constructed as an aluminum extrusion. Steering shaft 470, which is typically made of steel and forms a part of front leg 458, is disposed through front leg 458 to provide steering for snowmobile 460. Steering shaft 470 adds to the overall weight of front suspension 452.

The complexity of front leg 458 is attributable not only to the design of the component but also to the considerable amount of machining and assembly that are required after front leg 458 is extruded. For example, hole 472 must be drilled through front leg 458 to accommodate steering shaft 470. Moreover, three holes 482, 484, and 486 must be drilled through front leg 458 to accommodate upper A-arm 452, lower A-arm 454, and shock absorber 462. In addition, while not shown in the drawings, a hollow shaft is welded between the sides of front leg 458 to accommodate the pins (such as pin 466) that connect upper A-arm 454, lower A-arm 456, and shock absorber 462 to front leg 458. A bushing is usually placed within the hollow shaft to facilitate pivoting motion of the pins inserted therethrough. All of this adds considerably to the overall weight and construction cost of snowmobile 460.

In the manufacture of snowmobiles (as with the construction of any product), one goal is to reduce the weight of the final vehicle. Another object is to reduce the complexity of the vehicle. Both goals ultimately reduce the overall manufacturing cost of the vehicle.

The inventors of the present invention recognized that a hybrid approach between the two prior art suspensions might accomplish both of these objectives. Namely, a hybrid approach might provide both a more simplified construction and a lower weight for a front suspension. In addition, the inventors recognized that such a hybrid approach might provide a front suspension that could be applicable both to snowmobiles, wheeled vehicles, ATVs, and other recreational vehicles.

No prior art front suspension, however, offers or suggests a practicable approach.

SUMMARY OF THE INVENTION

In view of the foregoing, one object of the present invention is to exploit the design elements of a snowmobile that are easily and readily transferred to the design of a wheeled vehicle, such as an ATV, based on a basic frame structure.

To that end, one object of the present invention is to provide a front suspension that incorporates a double A-arm construction which does not require a heavy, front leg with a steering shaft disposed therein.

It is another object of the present invention to provide a front suspension for a snowmobile, wheeled vehicle, or ATV that does not require a trailing arm.

Accordingly, it is an object of the present invention to provide a front suspension with a light-weight leg that is rotatable about a vertical axis.

It is still another object of the present invention to provide a suspension for a vehicle that includes an upper A-arm and a lower A-arm. The suspension further includes a leg with a vertical axis that is rotatably connected to both the upper A-Arm and the lower A-arm. A mechanical link is rotatably connected to the leg so that movement of the mechanical link applies rotational force to the leg to cause the leg to rotate about the vertical axis.

Another object of the present invention is to provide a suspension further including a first ball joint connecting the upper A-arm to the leg, a second ball joint connecting the lower A-arm to the leg, and a third ball joint connecting the mechanical link to the leg.

A further object of the present invention is to provide a suspension where the leg is an aluminum extrusion with the direction of the extrusion perpendicular to the vertical axis of the leg.

Another object of the present invention is to provide a suspension where the leg is squeeze-cast aluminum.

A further object of the present invention is to provide a snowmobile and a wheeled vehicle, such as an ATV, including such a suspension.

Still other objects of the present invention will be made apparent by the discussion that follows.

BRIEF DESCRIPTION OF THE DRAWINGS

The invention will be more fully described in conjunction with the following drawings wherein:

FIG. 8 is a front view illustration of an upper column of the frame assembly shown in FIG. 6;

FIG. 9 is a left side view illustration of the upper column depicted in FIG. 8;

FIG. 10 is a right side view illustration of the upper column shown in FIG. 8;

DESCRIPTION OF THE PREFERRED EMBODIMENTS

Before delving into the specific details of the present invention, it should be noted that the conventions "left," "right," "front," and "rear" are defined according to the normal, forward travel direction of the vehicle being discussed. As a result, the "left" side of a snowmobile is the same as the left side of the rider seated in a forward-facing position on the vehicle (or travelling in a forward direction on the vehicle).

Figure 1:
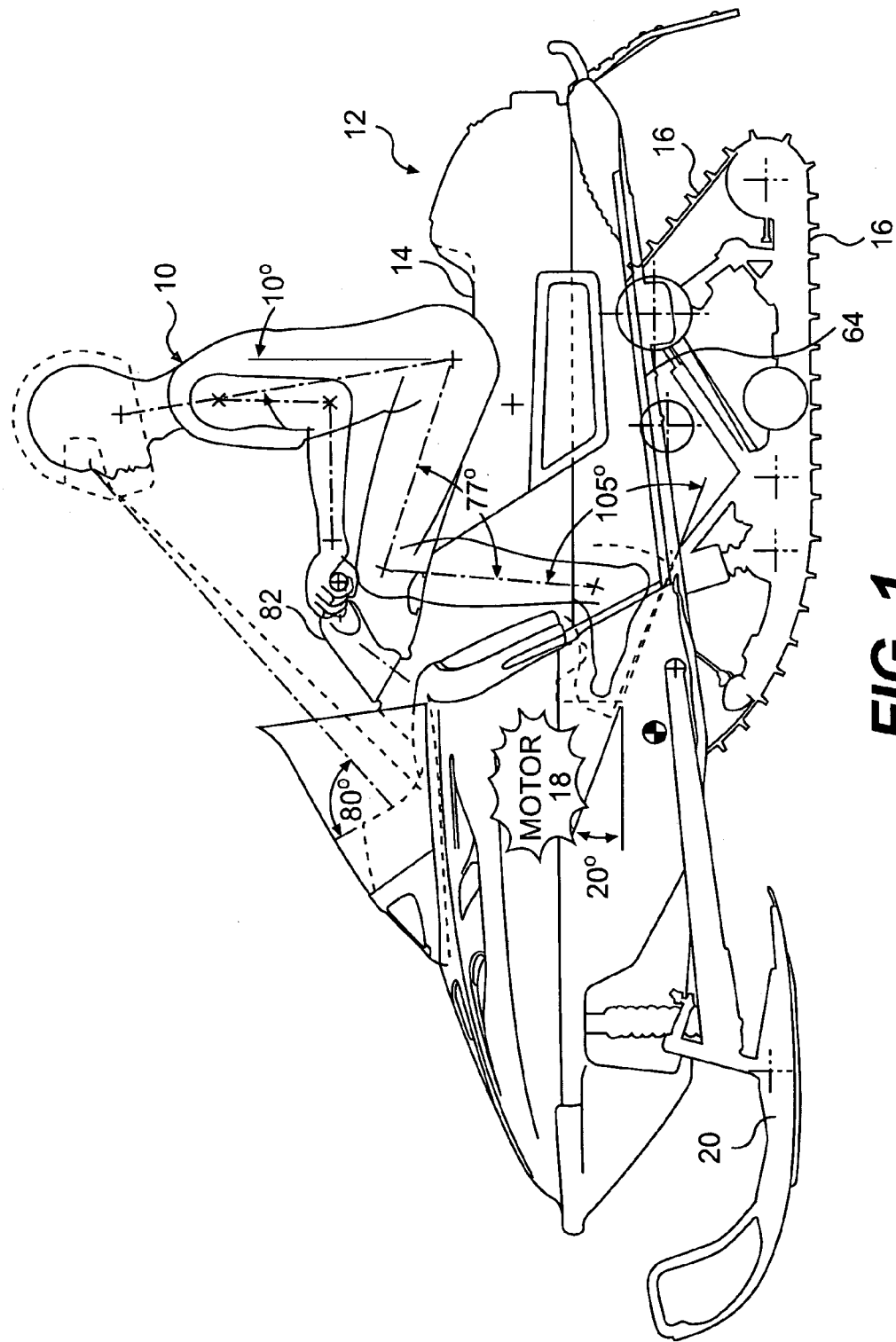
FIG. 1 is a side-view schematic illustration of a prior art snowmobile, showing the prior art positioning of a rider thereon.

FIG. 1 illustrates a rider operator 10 sitting on a prior art snowmobile 12. Rider 10 is positioned on seat 14, with his weight distributed over endless track 16. Motor 18 (shown in general detail) is located over skis 20. As with any snowmobile, endless track 16 is operatively connected to motor (or engine) 18 to propel snowmobile 12 over the snow. Motor or engine 18 typically is a two-stroke internal combustion engine. Alternatively, a 4-stroke internal combustion engine may be substituted therefor. In addition, any suitable engine may be substituted therefor.

Figure 2:
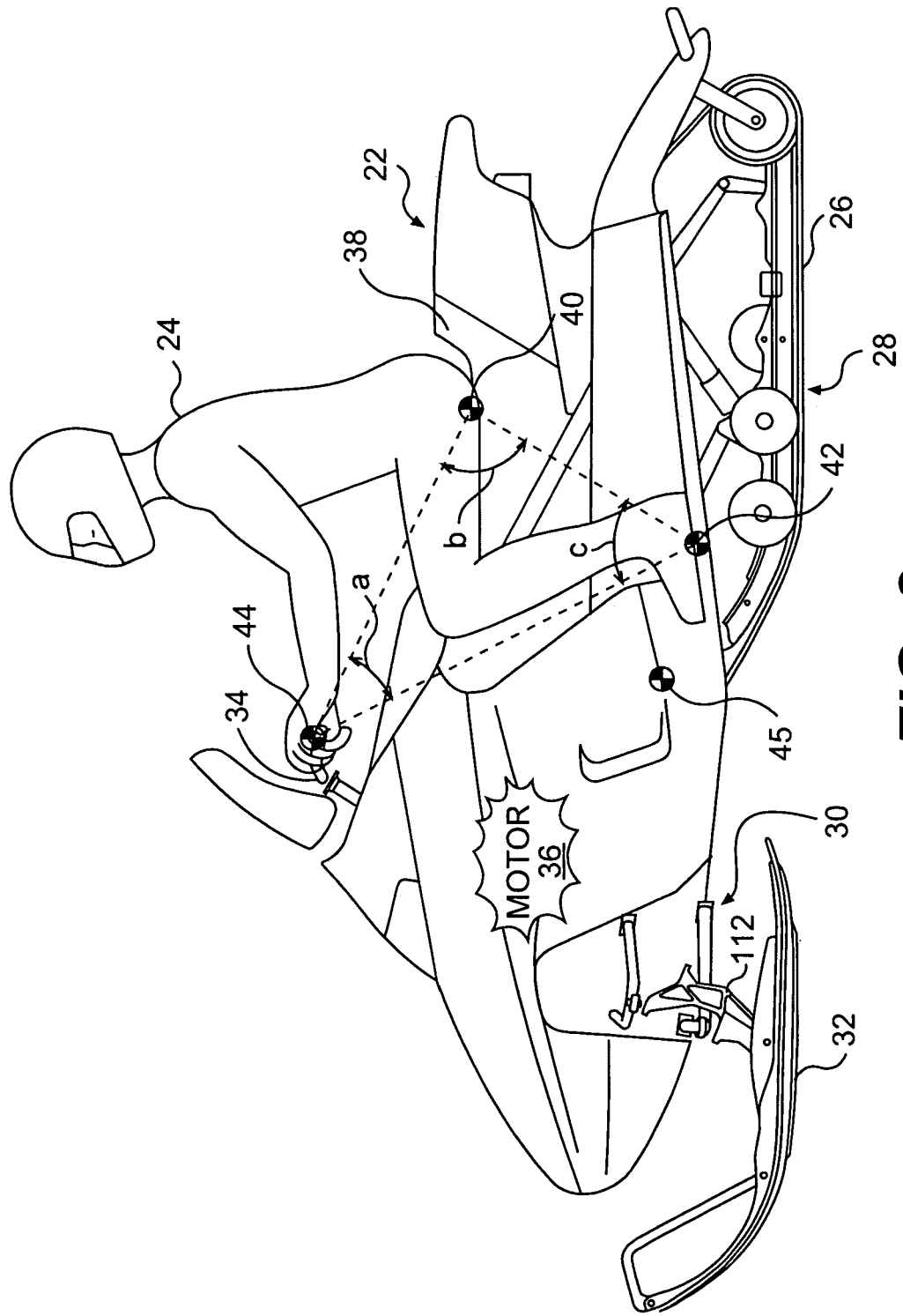
FIG. 2 is a side view illustration of the exterior of a snowmobile constructed according to the teachings of the present invention, also showing the positioning of a rider thereon.

FIG. 2 provides a side view of a snowmobile 22 constructed according to the teachings of the present invention. Here, rider/operator 24 is shown in a more forward, racing-like position, which is one of the aspects of the present invention. In this position, the weight of operator 24 is forward of the position of rider 10 in the prior art example.

The positioning of rider 24 closer to motor 36 offers several advantages that are not achieved by the prior art. For example, since rider 24 is positioned closer to the engine 36, the center of gravity of rider 24 is closer to the center of gravity of the vehicle, which is often at the drive axle of the vehicle or near thereto. In other words, rider 24 has his weight distributed more evenly over the center of gravity of the vehicle. As a result, when the vehicle traverses rough terrain, rider 24 is better positioned so that he does not experience the same impact from an obstacle as rider 10 on snowmobile 12. The improved rider positioning illustrated in FIG. 2 also improves the rider's ability to handle the vehicle.

FIG. 2 illustrates the basic elements of snowmobile 22. Snowmobile 22 includes an endless track 26 at its rear for propulsion. A rear suspension 28 connects endless track 26 to the vehicle frame. Snowmobile 22 also includes a front suspension 30. Skis 32, which are operatively connected to handlebars 34, are suspended from the front suspension 30 for steering the vehicle. A motor or engine (preferably, an internal combustion engine) 36 is located at the front of snowmobile 22, above skis 32. Operator 24 is seated on a seat 38, which is positioned above the endless track 26.

Three positional points of particular relevance to the present invention are also shown in FIG. 2. Specifically, seat position 40, foot position 42, and hand position 44 of operator 24 are shown. In the modified seating position of operator 24, which is made possible by the teachings of the present invention, hand position 44 is forward of foot position 42, which is forward of seat position 40. The three positions define three angles, a, b, and c between them that help to define the seating position of operator 24 and permit rider 24 to be closer to center of gravity 45 of the vehicle. Moreover, hand position 44 is forward of center of gravity 45 of snowmobile 22.

Figure 3:
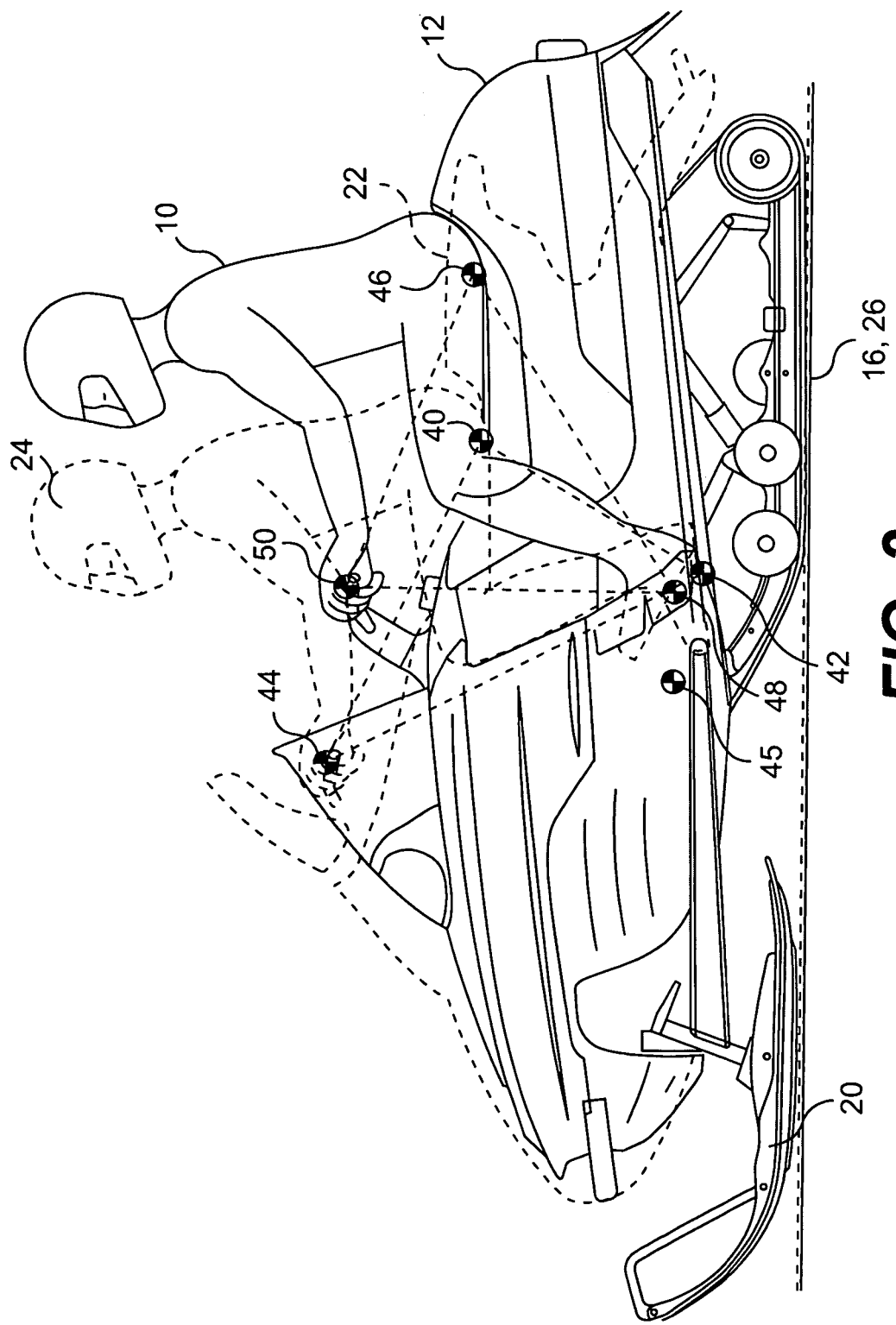
FIG. 3 is an overlay comparison between the a prior art snowmobile (of the type depicted in FIG. 1) and a snowmobile constructed according to the teachings of the present invention (as shown in FIG. 2), illustrating the difference in passenger positioning, among other features.

FIG. 3 provides an overlay between prior art snowmobile 12 and snowmobile 22 constructed according to the teachings of the present invention. Rider 10 (of prior art snowmobile 12) is shown in solid lines while operator 24 (of snowmobile 22) is shown in dotted lines for comparison.

The comparative body positions of rider 10 and operator 24 are shown. As is apparent, the present invention permits the construction of a snowmobile 22 where the rider 24 is in a more forward position. Moreover seat position 40, foot position 42, and hand position 44 differ considerably from seat position 46, foot position 48, and hand position 50 in the prior art snowmobile 12. In this position, the center of gravity of operator 24 is closer to center of gravity 45 of snowmobile 22 than in the prior art example.

Figure 4:
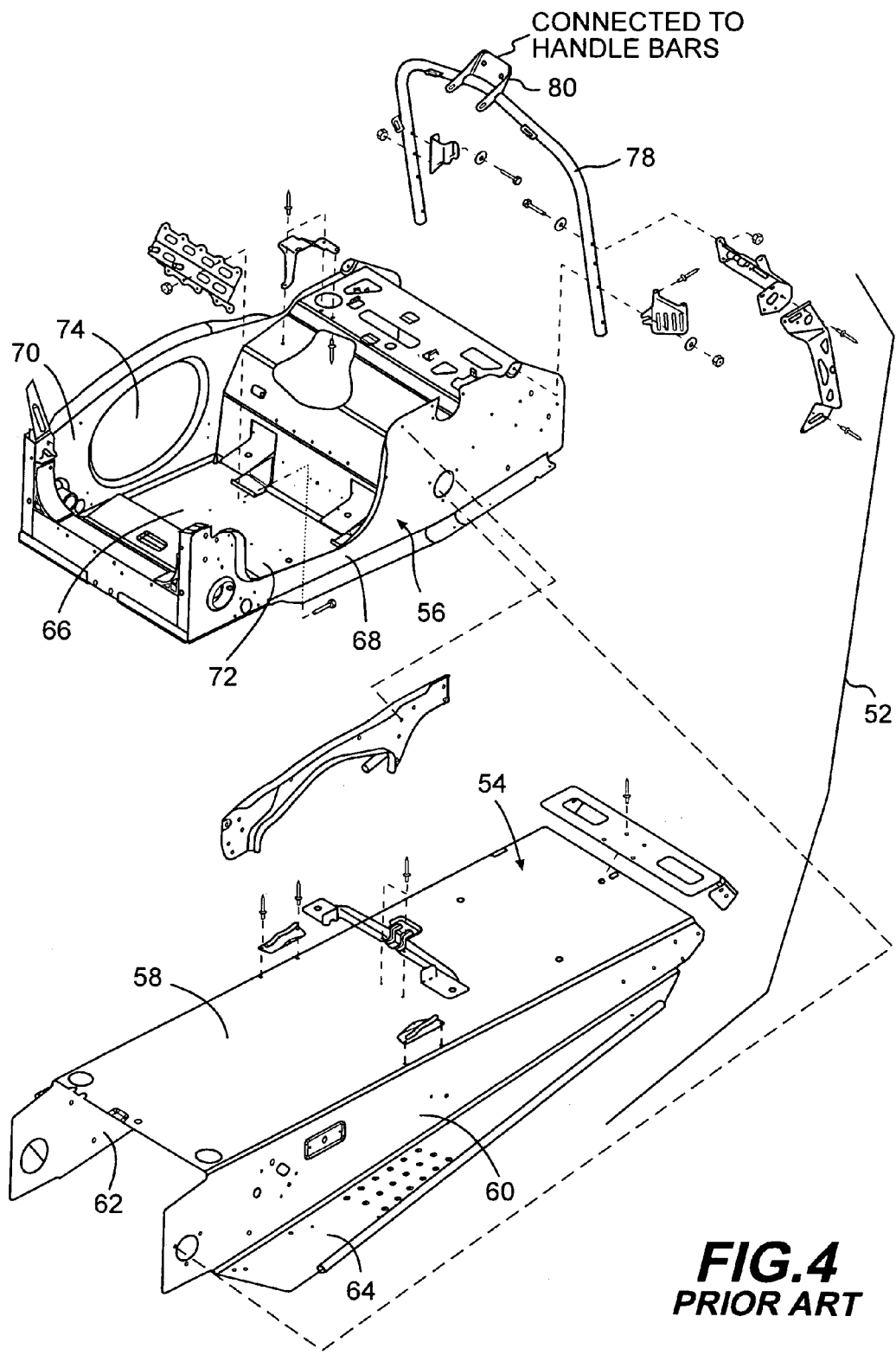
FIG. 4 is an exploded view of a frame assembly representative of the type of construction typical of a snowmobile assembled according to the teachings of the prior art (specifically, the view illustrates the components of a 2000 model year Ski-Doo® Mach™ Z made by Bombardier Inc. of Montréal, Québec, Canada)

As a basis for comparison with the figures that provide the details of the present invention, FIG. 4 provides an exploded view of a frame assembly 52 for a snowmobile constructed according to the teachings of the prior art. Frame assembly 52 includes, as its major components, a tunnel 54 and an engine cradle 56. As illustrated, engine cradle 56 is positioned in front of tunnel 54. Engine cradle 56 receives motor 18.

As shown in FIG. 4, tunnel 54 is basically an inverted U-shaped structure with a top plate 58 integrally formed with left and right side plates 60, 62, respectively. Top plate 58 provides the surface onto with seat 14 is mounted, as would be known to those skilled in the art. Foot boards 64 (of which only the left foot board is visible in FIG. 4) are integrally formed with the side plates 60, 62 and extend outwardly, perpendicular to the plane of side plates 60, 62. Foot boards 64 provide a location on which rider 10 may place his feet during operation of snowmobile 12. Top plate 58, side plates 60, 62, and foot boards 64 are made of aluminum and formed as an integral structure.

FIG. 4 also shows that engine cradle 56 is connected to tunnel 54 by any suitable means known to those skilled in the art. For example, engine cradle 56 may be welded or bolted to tunnel 54. Engine cradle includes a bottom plate 66 and left and right side walls 68, 70, which are provided with left and right openings 72, 74, respectively. Left opening 72 is provided so that the shafts for the transmission (typically a continuously variable transmission or CVT) may extend outwardly from left wall 68. The shafts that connect the engine 18 to the transmission pass through left opening 72. A gearbox (not shown) typically is provided on the right side of snowmobile 10. The shafts that connect engine 18 to the gearbox pass through right opening 74. Left and right openings 72, 74 also allow heat from engine 18 to be radiated from engine cradle 56, which assists in cooling engine 18.

As FIG. 4 illustrates, left side wall 68 is provided with a beam 76 that is removably connected thereto. Beam 76 may be removed during servicing, for example, to facilitate access to the engine components and peripheral elements disposed within left opening 72.

FIG. 4 also illustrates the placement of a handlebar support element 78, which connects to the rear of engine cradle 56. Handlebar support element 78 is generally an inverted U-shaped structure that extends upwardly from the combined engine cradle 56 and tunnel 54. A bracket 80 is positioned at the midpoint of handlebar support element 78 and provides structural support for handlebars 82, which is used to steer snowmobile 12.

To provide an improved driver positioning, as described above, the inventors of the present invention appreciated the advantages of moving handlebars 82 forward of the position shown in FIG. 1. To do this, however, required a novel approach to the construction of frame assembly 52 of snowmobile 12. The redesign resulted in the present invention, which is described in detail below.

Figure 5:
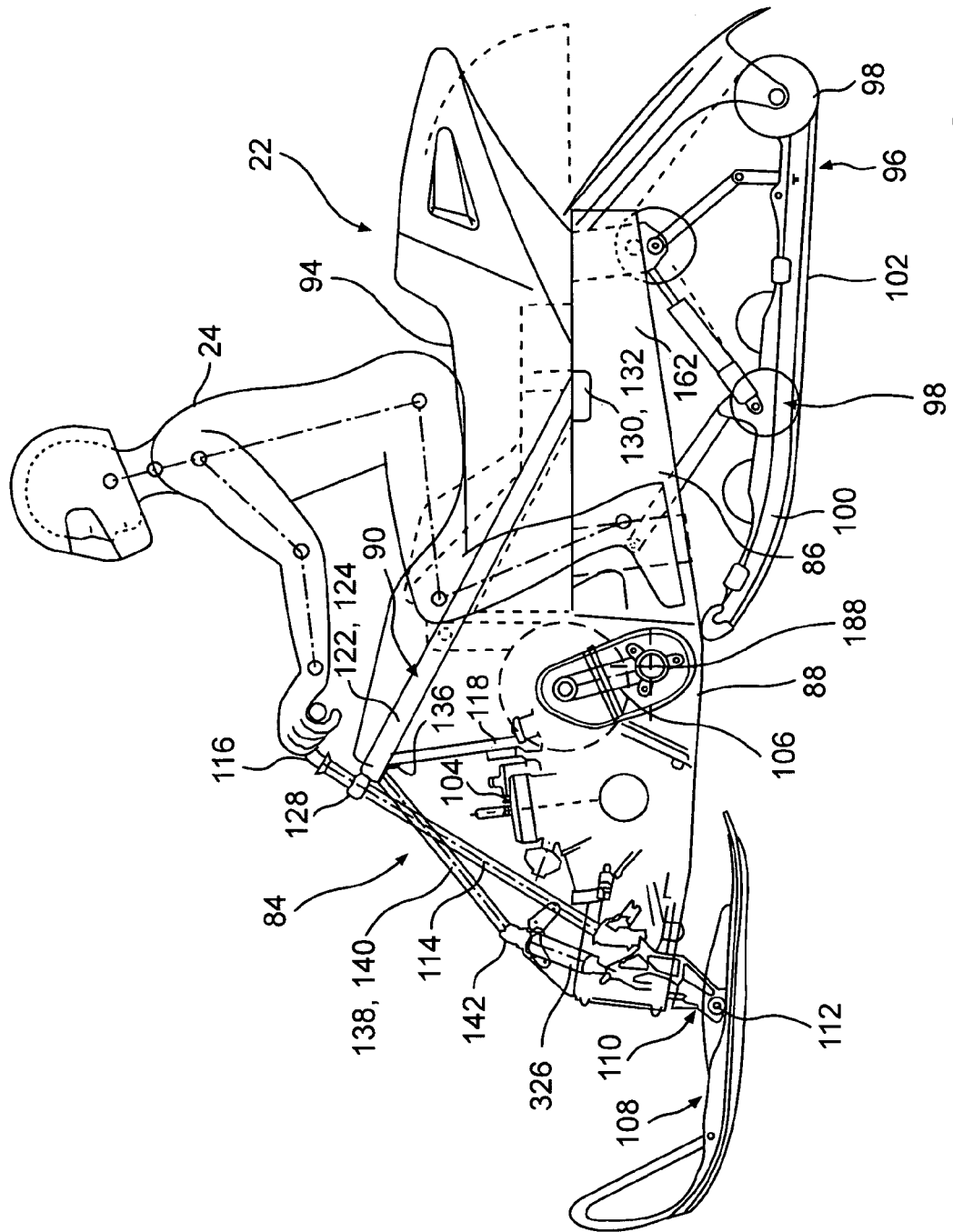
FIG. 5 is a side view schematic illustration of the snowmobile illustrated in FIG. 2, with the fairings and external details removed to show some of the internal components of the snowmobile and their positional relationship to one another.

As illustrated in FIG. 5, snowmobile 22 incorporates a completely redesigned frame assembly 84. Frame assembly 84 includes, among other elements, tunnel 86, engine cradle 88, and over-arching frame elements 90. As with snowmobile 12, snowmobile 22 includes a seat 94 on which rider 24 sits while operating snowmobile 22. Tunnel 86 is connected to a rear suspension 96 that contains a number of wheels 98 disposed on a slide frame 100 around which an endless track 102 rotates to propel snowmobile 22 across the snow.

Endless track 102 is connected to engine 104 (preferably a two or four stroke internal combustion engine) positioned within engine cradle 88. Endless track 102 is connected to engine 104 through a transmission 106, which is preferably a continuously variable transmission (or "CVT"), as is known in the art.

Two skis 108 are provided at the front of snowmobile 22 for steering. Skis 108 are connected to engine cradle 88 through a front suspension 110. Front suspension 110 connects to skis 108 through a pivot joint 112 on the top of skis 108. Skis 108 are operatively connected to a steering shaft 114 that extends over engine 104. Steering shaft 114 is connected, in turn, to handlebars 116, which are used by operator 24 to steer snowmobile 22.

Figure 6:
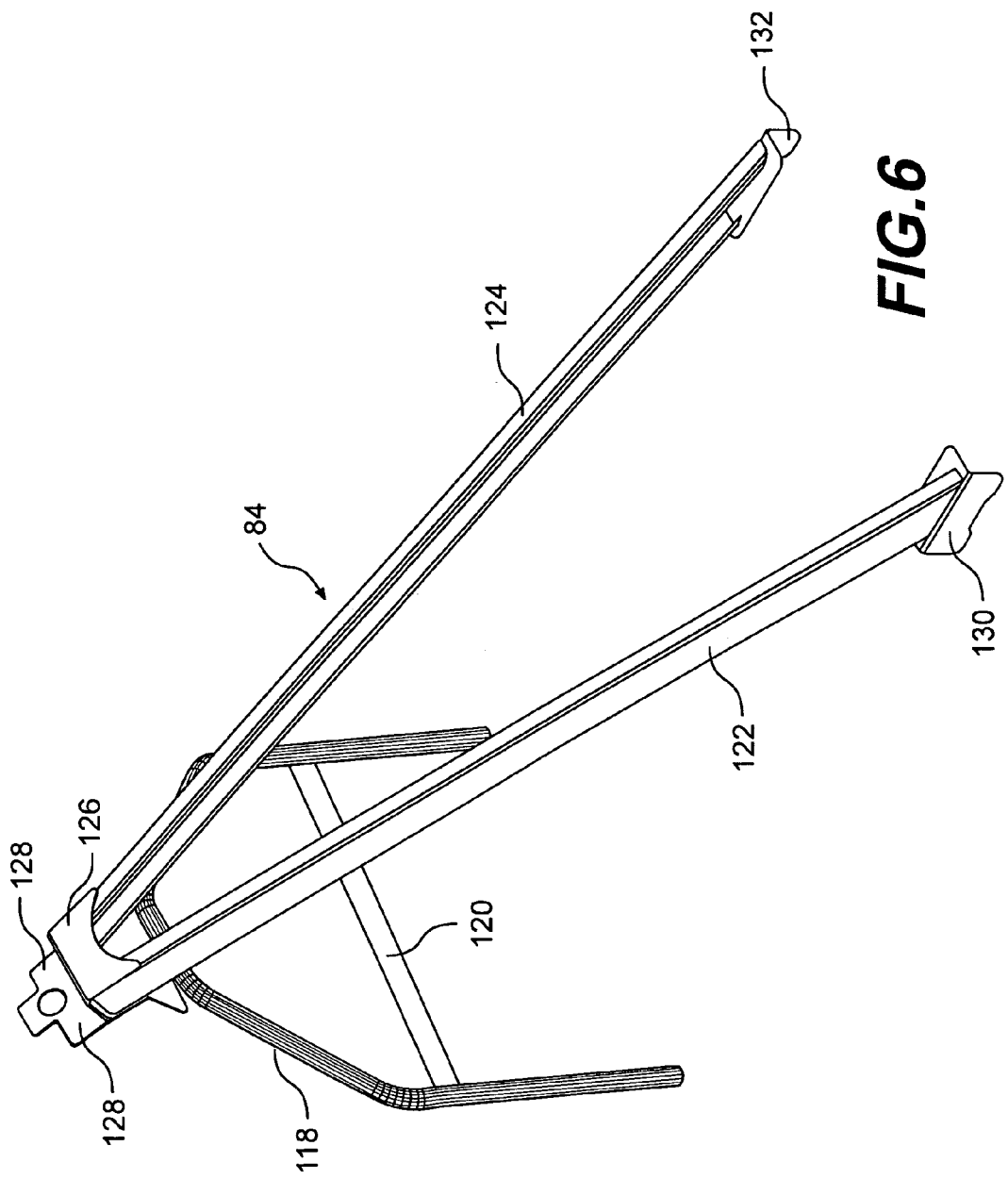
FIG. 6 is a perspective illustration of a portion of the frame assembly of the present invention, specifically the portion disposed toward the rear of the vehicle.

FIG. 6 illustrates the individual elements of rear frame assembly 84 in greater detail. Rear frame assembly 84 includes an upper column 118, which is an inverted U-shaped structural element. If necessary, upper column 118 may be reinforced with a cross-member 120, but this is not needed to practice the present invention. A left brace 122 and a right brace 124 are connected to a bracket 126 above upper column 118. A bushing or bearing (or other similar element) 128 is attached to bracket 126 and accepts steering shaft 114 therethrough. It also secures steering shaft 114 to rear frame assembly 84. Left and right braces 122, 124 include left and right brackets 130, 132 at their lower portions. Left and right brackets 130, 132 secure left and right braces 122, 124 to tunnel 86 of snowmobile 22.

It should be noted that, while the construction of frame assembly 84 that is illustrated involves the use of tubular members, frame assembly 84 may also be constructed according to a monocoque or pseudo-monocoque technique. A monocoque construction is one where a single sheet of material is attached to an underlying frame (such as with the construction of an aircraft). The skin applied to the frame adds rigidity to the underlying frame structure. In a similar manner, a pseudo-monocoque technique provides a rigid structure by providing a frame constructed from a single sheet of material.

Instead of constructing frame assembly 84 from a number of tubular members, frame assembly 84 may be constructed from a single sheet of material (such as aluminum) that has been pressed or molded into the appropriate shape using a pseudo-monocoque manufacturing technique. As would be understood by those skilled in the art, this would result in a construction that has a high strength with a low weight.

Figure 7:
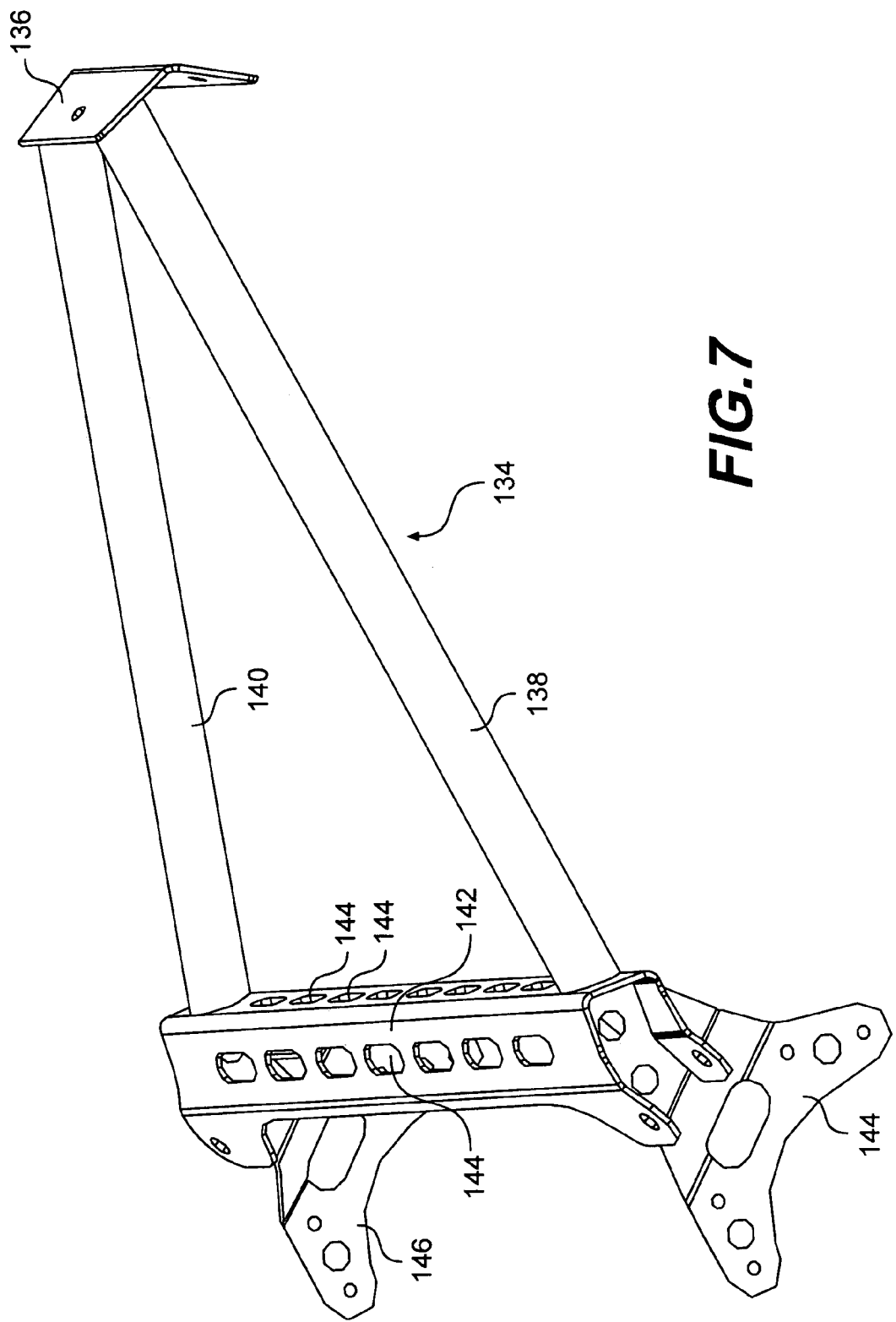
FIG. 7 is a perspective illustration of a forward support frame, which connects with the portion of the frame assembly depicted in FIG. 6.

FIG. 7 illustrates a forward support assembly 134 (also called front triangle 134), which connects to bracket 126 and extends forwardly of bracket 126. Forward support assembly 134 includes a bracket 136 at its rear end that connects to bracket 126 of frame assembly 84 (preferably by welding). Forward support assembly 134 also has left and right braces 138, 140 that extend forwardly and downwardly from bracket 136 and are connected thereto preferably by welding. Left and right braces 138, 140 are connected at their forward ends by a cross-member 142, which includes a plurality of holes 144 therein to lighten the weight thereof. Left and right connecting brackets 145, 146 are connected to cross-member 142. Left and right connecting brackets 145, 146 connect, in turn, to front suspension 110.

FIGS. 8, 9, and 10 illustrate upper column 118 in greater detail. As described above, upper column 118 is essentially an inverted U-shaped member that is preferably tubular in shape to facilitate its construction. Upper column 118 preferably is bent into the appropriate shape from a straight tube. As would be understood by those skilled in the art, however, upper column 118 need not be made as a tubular member.

Upper column 118 has left and right legs 148, 150 that extend downwardly from an apex 152. A bracket 154 is disposed at apex 152 for connection to bracket 126 of frame assembly 84. Preferably, bracket 154 is welded at the apex of upper column 118 (however any other suitable attachment means is possible). Left leg 148 includes a bracket 156 at its lower-most portion that connects left leg 148 to engine cradle 88. Similarly, right leg 150 includes a bracket 158 at its lower-most portion to connect right leg 150 to engine cradle 88. Preferably, brackets 156, 158 are welded to upper column 118. Left and right legs 148, 150 preferably attach to engine cradle 88 via bolts or other suitable fasteners.

Figure 11:
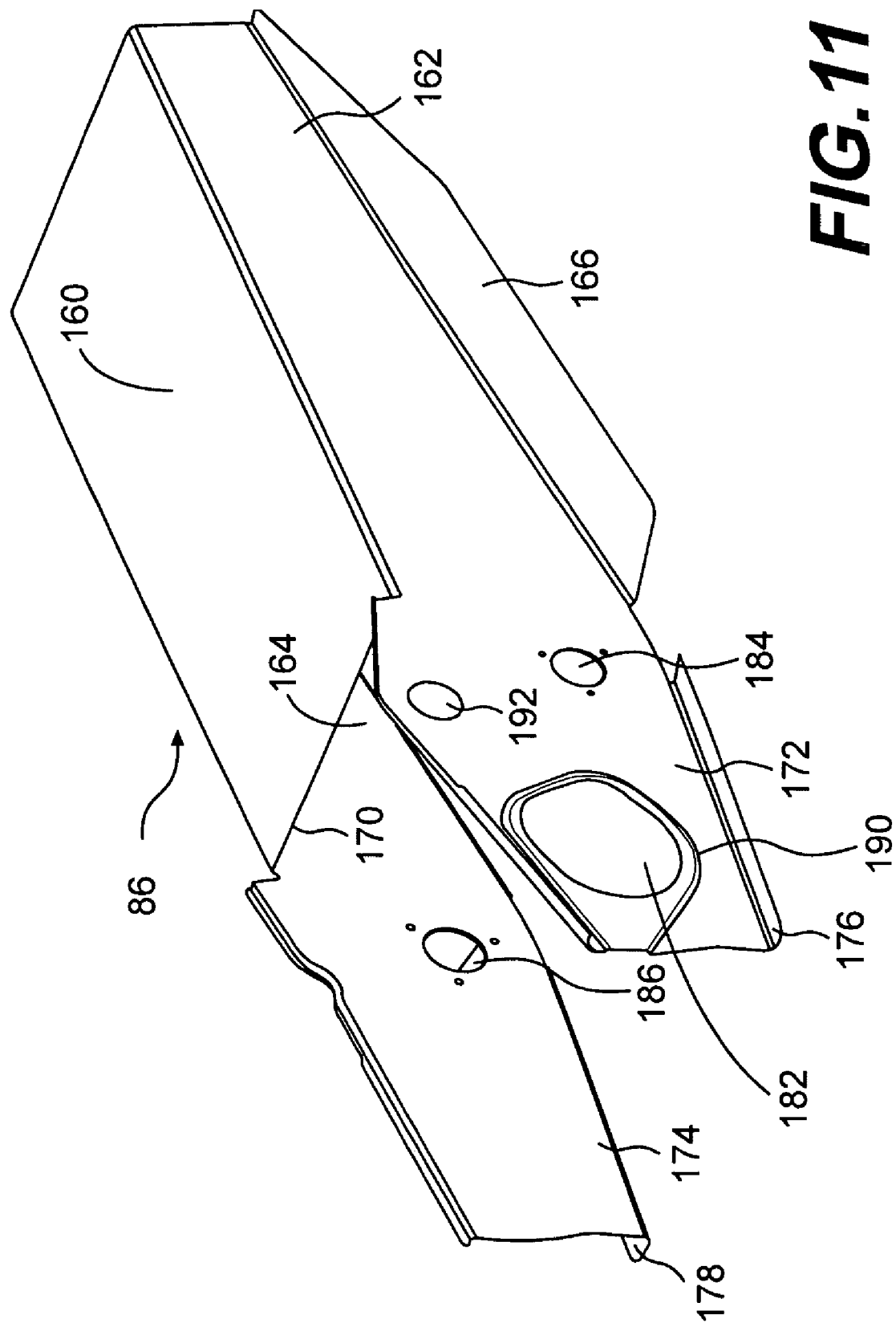
FIG. 11 is a perspective illustration, from the front left side, of a tunnel portion of the frame assembly of the present invention.
Figure 12:
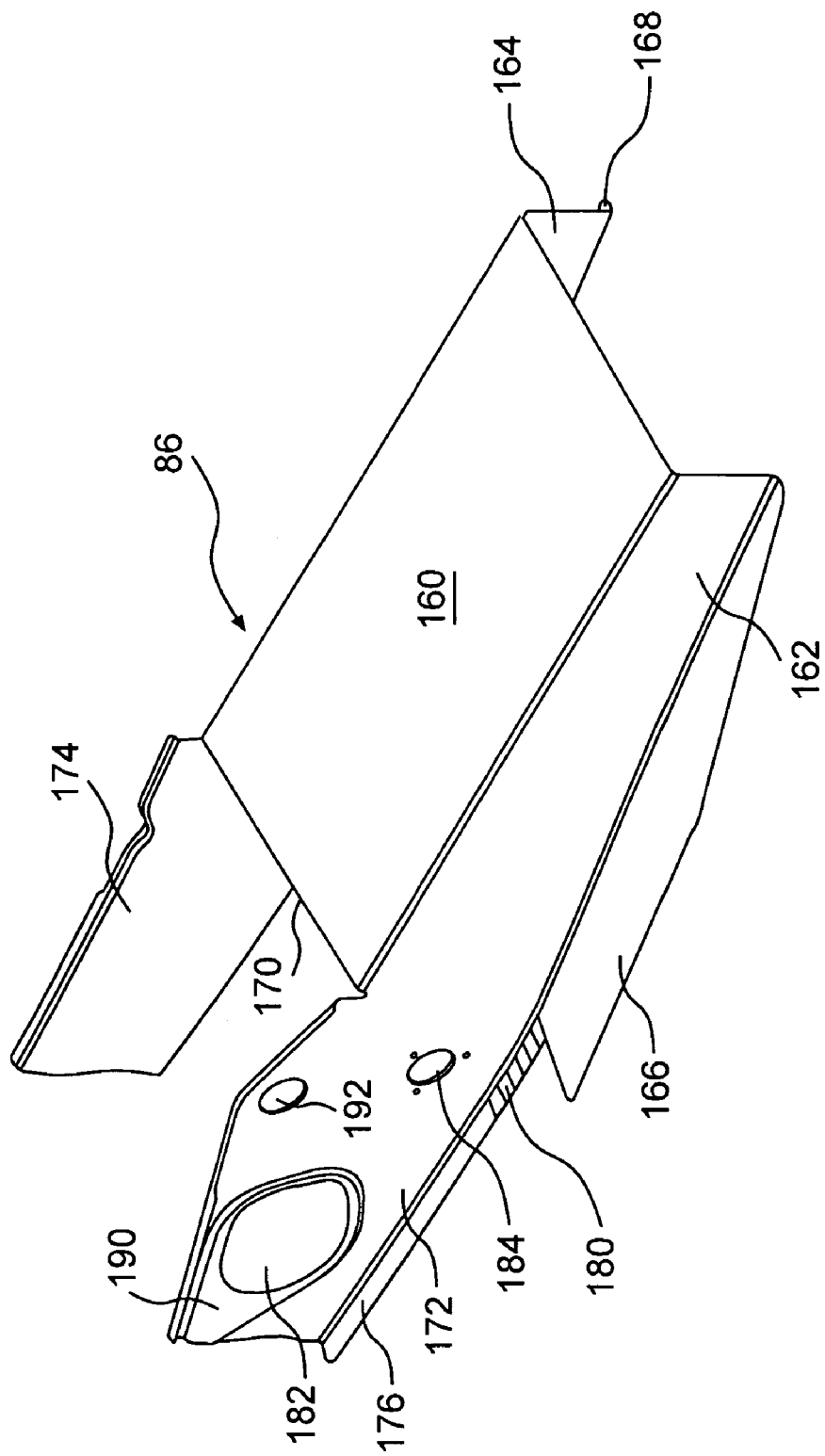
FIG. 12 is another perspective illustration, from the rear left side, of the tunnel portion of the present invention shown in FIG. 11.

FIGS. 11 and 12 illustrate tunnel 86 in greater detail. Tunnel 86 includes a top plate 160 with left and right downwardly extending side plates 162, 164. A left foot rest 166 extends outwardly from the bottom of left side plate 162. Similarly, a right foot rest 168 extends outwardly from the bottom portion of right side plate 164. Left and right foot rests 166, 168 provide a location along tunnel 86 onto which rider 24 may place his or her feet while operating snowmobile 22.

Left side plate 162 extends forwardly beyond the front portion 170 of tunnel 86 to form a left engine cradle wall 172. Similarly, right side plate 164 extends forwardly of front end 170 of tunnel 86 to form right engine cradle wall 174. At the lower edge of left and right engine cradle walls 172, 174, there are laterally extending portions 176, 178, which serve to strengthen left and right engine cradle walls 172, 174. Removable elements 180 extend between left foot rest 166 and left laterally extending portion 176. Removable portions 180 may or may not be removed between left foot rest 166 and left laterally extending portion 176. FIG. 11 shows removable portions 180 removed, while FIG. 12 shows removable portions 180 not removed. It should be noted that the same removable portions 180 may or may not extend between right foot rest 168 and right laterally extending portion 178.

Left engine cradle wall 172 preferably includes an opening 182 therethrough. Opening 182 permits the shafts from transmission 106 to pass therethrough. Unlike left engine cradle wall 172, right engine cradle wall 174 does not include such an opening. Instead, right engine cradle wall 174 is essentially solid. Due to its construction, right engine cradle wall 174 reflects radiant heat from engine 104 back to engine 104 to assist in minimizing heat dissipation from engine 104. Left and right openings 184, 186 are provided through left and right engine cradle walls 172, 174 so that a drive shaft 188 may pass therethrough. Drive shaft 186 connects to endless track 102 for propulsion of snowmobile 22. Opening 182 may be reinforced (about its periphery) by reinforcing member 190, also as illustrated in FIGS. 11 and 12. Left engine cradle wall 172 also includes an opening 192 above opening 184 through which a shaft passes for part of transmission 106.

Figure 13:
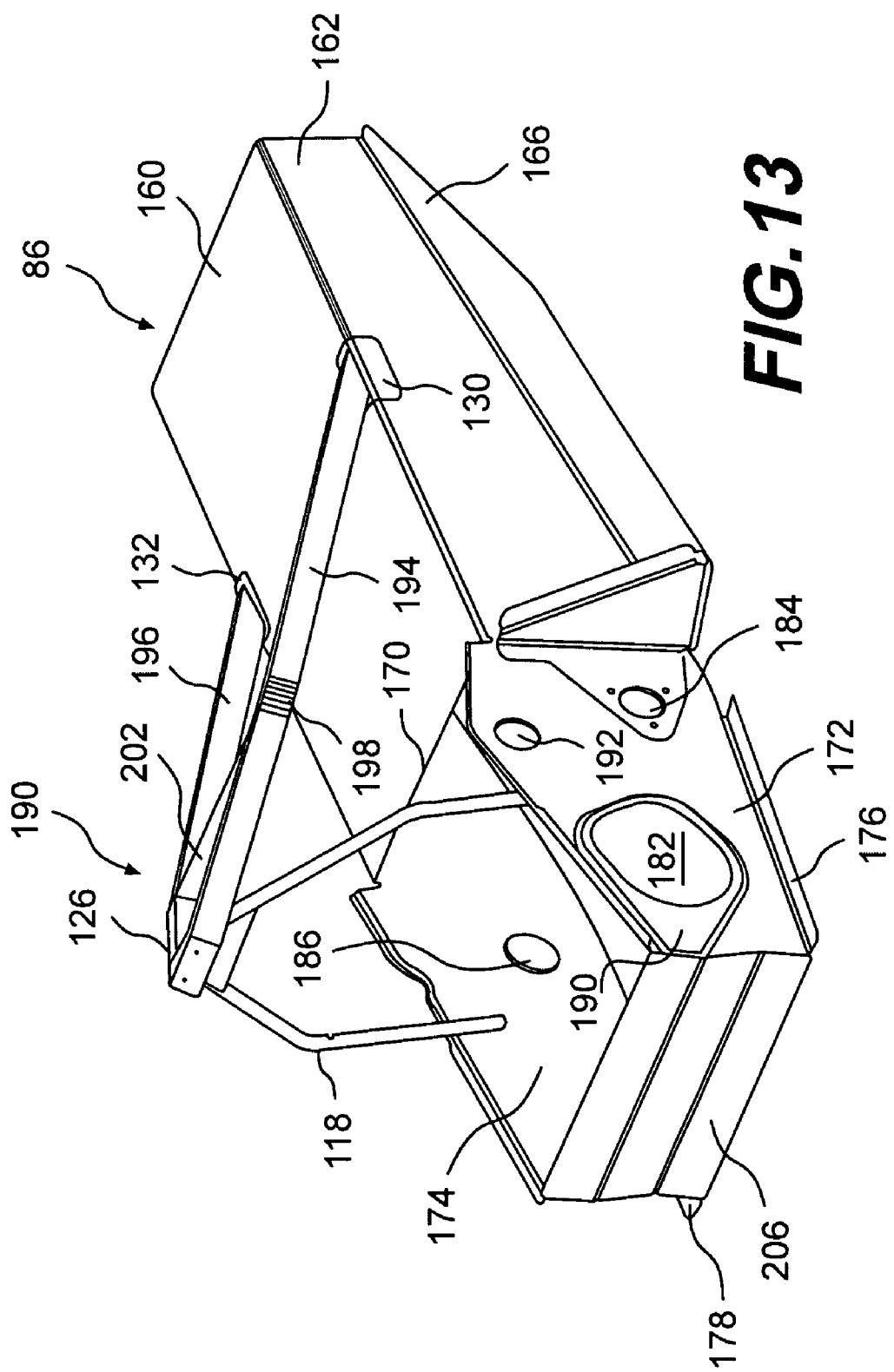
FIG. 13 is a perspective illustration, from the front left side, showing the combination of the frame assembly depicted in FIG. 6 connected to the tunnel portion depicted in FIGS. 11 and 12.
Figure 14:
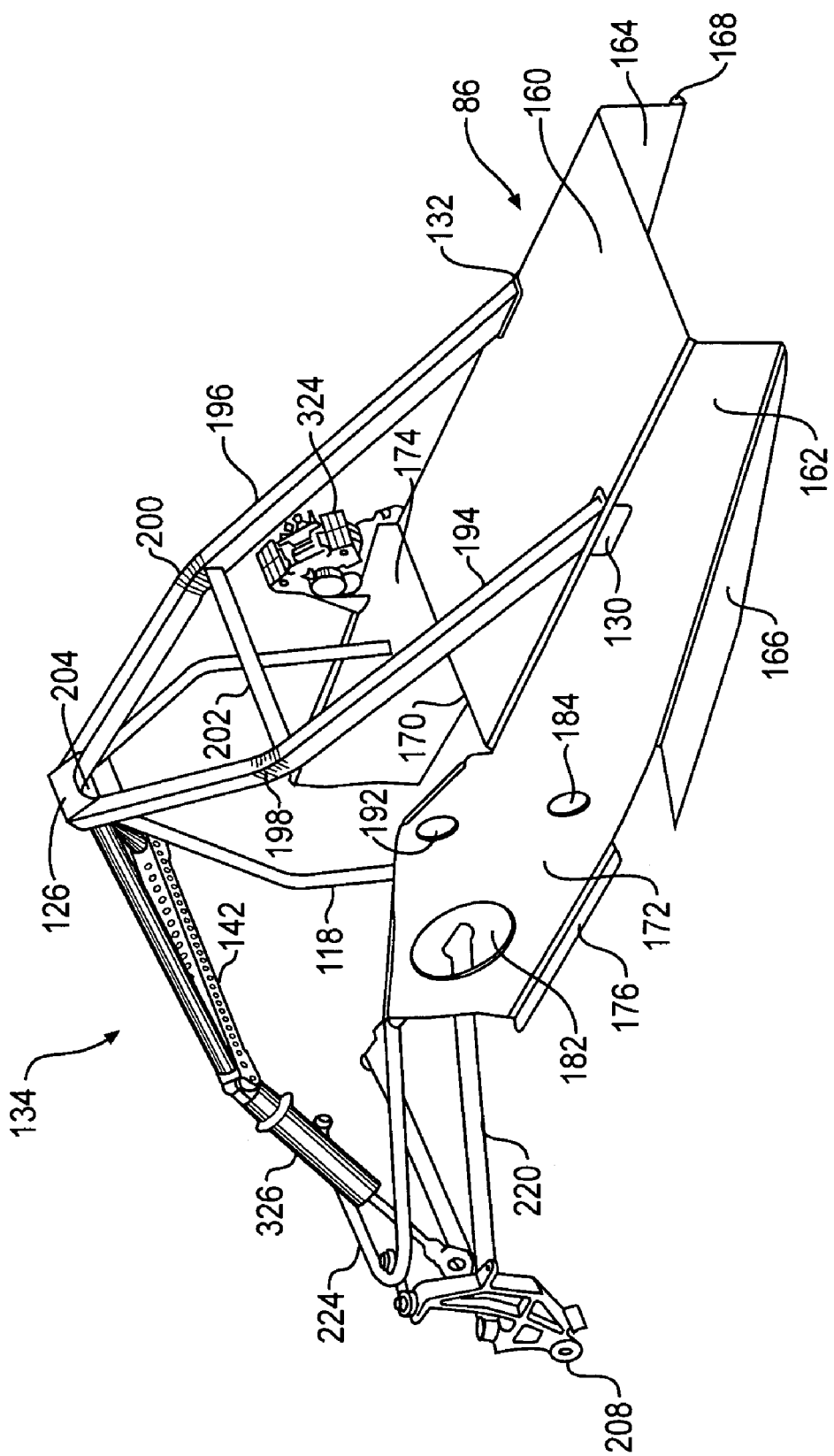
FIG. 14 is a perspective illustration, from the rear left side, showing the combination of the frame assembly depicted in FIG. 6 connected to the tunnel portion depicted in FIGS. 11 and 12 and also showing a portion of a front suspension assembly.

FIGS. 13 and 14 illustrate a combination of a variation of frame assembly 190 connected to tunnel 86. Frame assembly 190 includes upper column 118 as illustrated in FIGS. 8–10. However, frame assembly 190 differs somewhat from frame assembly 84. For example, left and right braces 194, 196 are shaped so that they extend outwardly from the positions defined by left and right braces 122, 124. As illustrated, left and right braces 194, 196 include elbows 198, 200; A cross-brace 202 optionally may be placed between left and right braces 194, 196 to add structural rigidity to frame assembly 190. As with frame assembly 84, a bracket 126 is provided at apex 204 where left and right braces 194, 196 meet one another. Forward support assembly 134 is the same as depicted in FIG. 7. A front engine cradle wall 206 is also shown in FIG. 13.

Figure 15:
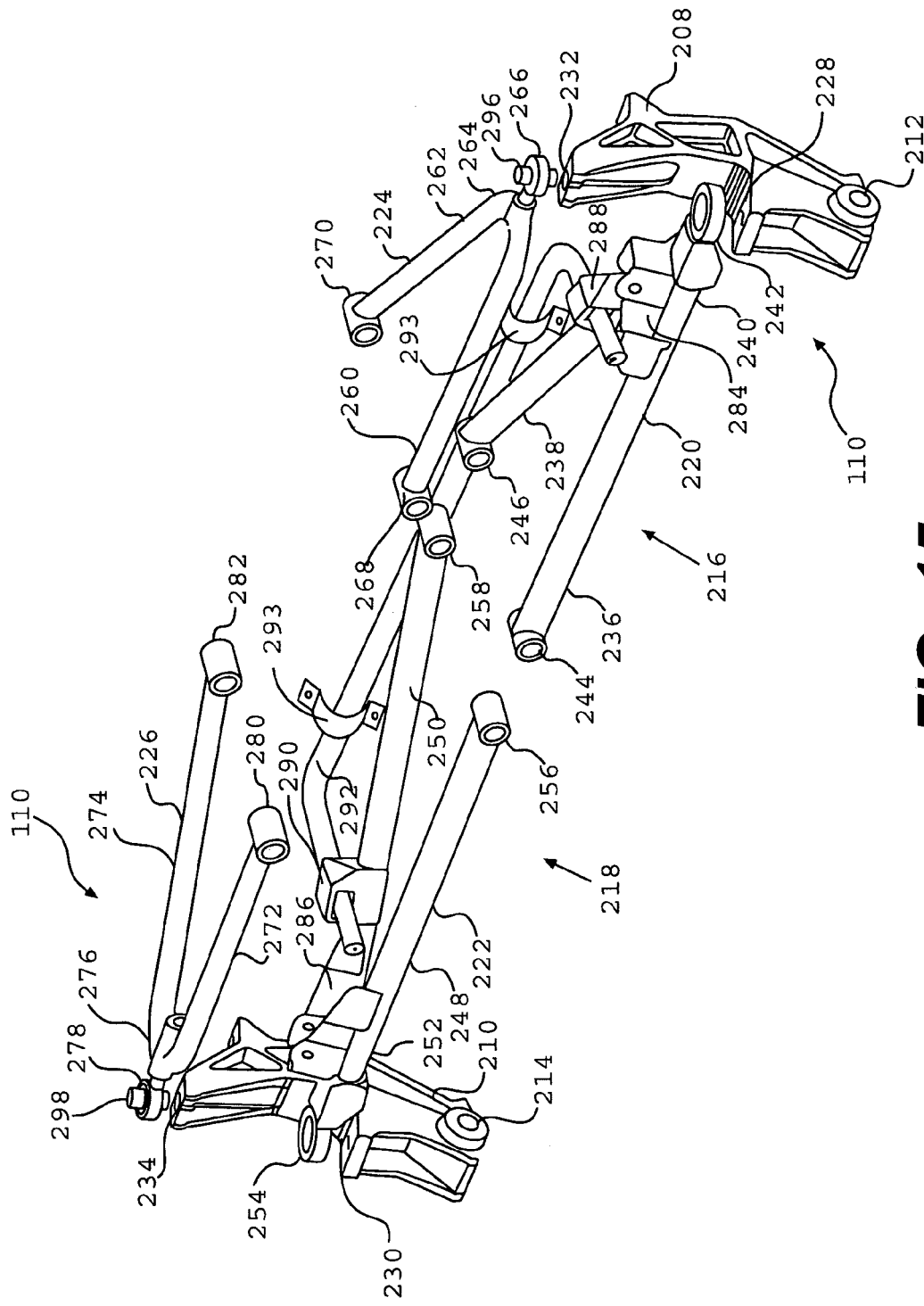
FIG. 15 is a perspective illustration, from the front left side, of some of the components that are part of the front suspension assembly depicted in FIG. 14.
Figure 16:
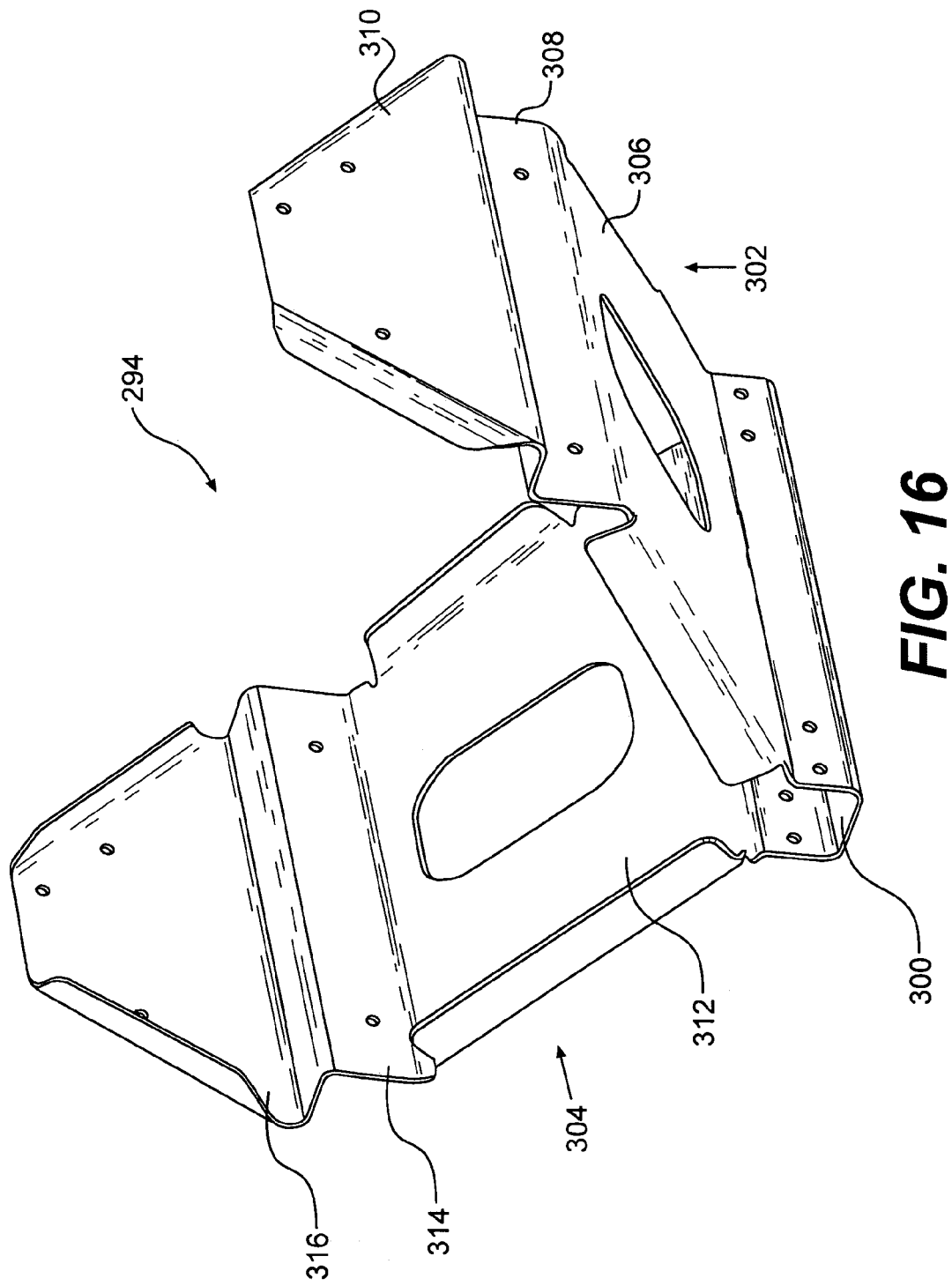
FIG. 16 is a perspective illustration, from the front left side, of a portion of a sub-frame that is part of the front suspension assembly illustrated in FIG. 15.
Figure 17:
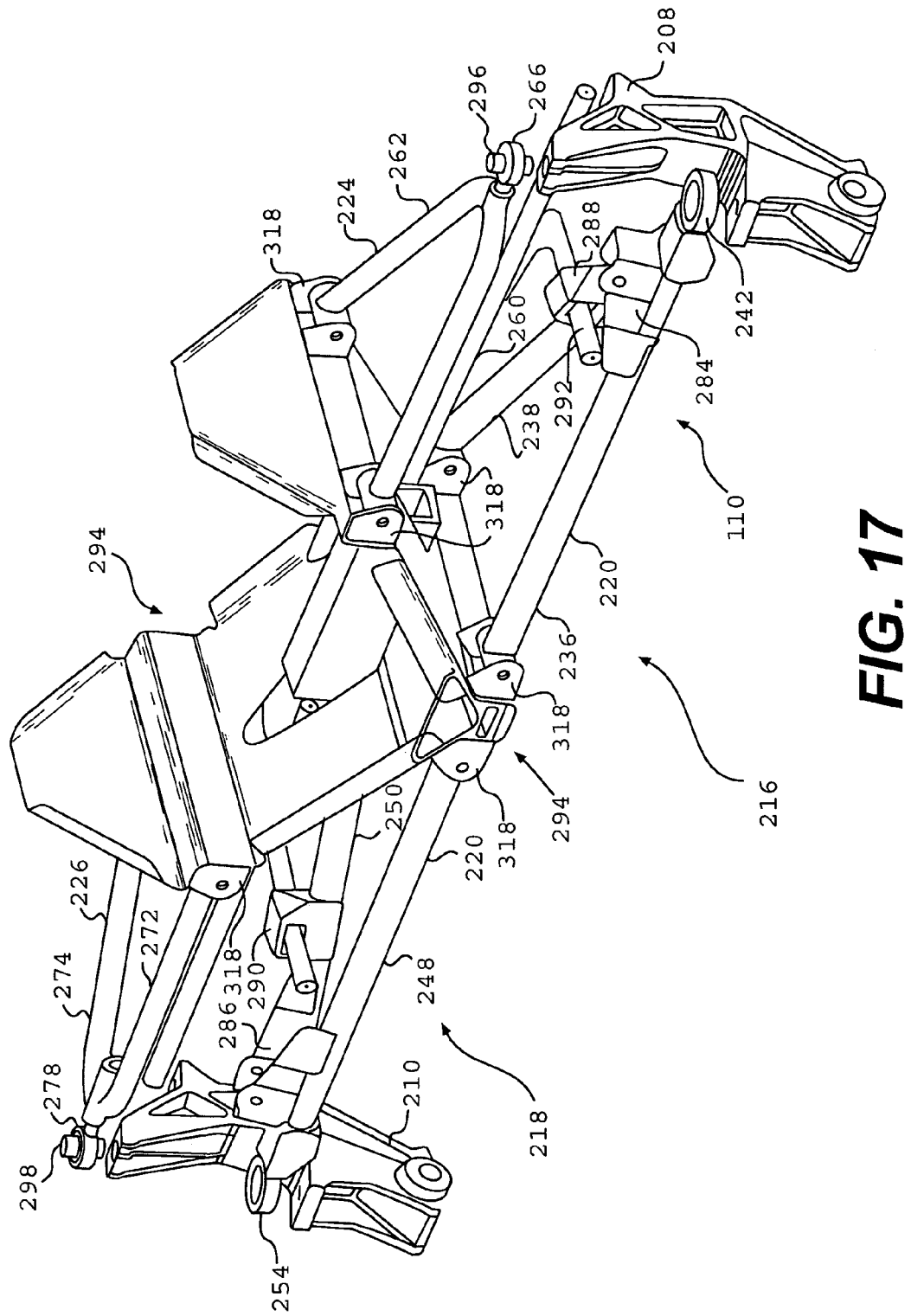
FIG. 17 is another perspective illustration, from the front left side, of the front suspension assembly for a snowmobile, constructed according to the teachings of the present invention, showing the positional relationship between the parts illustrated in FIG. 15 and the sub-frame illustrated in FIG. 16.

FIGS. 15–17 illustrate various aspects of front suspension 110 and associated structures. While the figures illustrate the embodiment preferably used in combination with snowmobile 22, it should be recognized that front suspension 110 may also be used in combination with a wheeled vehicle, as will be discussed in connection with FIGS. 23–27.

Front suspension 110 includes left and right ski legs 208, 210. Left and right ski legs 208, 210 are preferably made from aluminum and are preferably formed as extrusions. While an aluminum extrusion is preferred for left and right ski legs 208, 210, those skilled in the art would appreciate that ski legs could be made from any suitable material and in any acceptable manner that would provide similar strength and low weight characteristics. Left and right ski legs 208, 210 include holes 212, 214 through which a fastener (not shown) is disposed to pivotally connect skis 32 to snowmobile 22, as shown in FIG. 2.

Left and right ski legs 208, 210 are movably connected to left and right suspension arms 216, 218. Left and right suspension arms 216, 218 include lower left and right suspension support arms 220, 222 and upper left and right suspension support arms 224, 226, preferably in the shape of elongated cylindrical bodies.

As shown in FIGS. 15 and 17, lower left suspension support arm 220 connects to left ski leg at lower left attachment point 228 preferably through a ball joint (not shown) so that left ski leg 208 may pivot and rotate with respect to lower left suspension support arm 220. Similarly, lower right suspension support arm 222 connects to right ski leg 210 at lower right attachment point 230, preferably through a ball joint. Upper left suspension support arm 224 preferably attaches to left ski leg 208 at upper left attachment point 232, preferably through a ball joint or other suitable means. In addition, upper right suspension support arm 226 connects to right ski leg 210 at upper right attachment point 234 through a ball joint or other suitable means.

Lower left suspension support arm 220 includes front and rear members 236, 238, which meet at apex 240 where they connect with left lower eyelet 242. Front member 236 includes a joint 244 at an inner end, and rear member 238 includes a joint 246 also at an inner end. Similarly, lower right suspension support arm 222 includes front and rear members 248, 250, which meet at apex 252 where they connect with right lower eyelet 254. Front member 248 includes a joint 256 at an inner end and rear member 250 includes a joint 258 also at an inner end.

Upper left suspension support arm 224 includes front and rear members 260, 262, which meet at apex 264 where they connect with upper left eyelet 266. Front member 260 includes a joint 268 at an inner end, and rear member 262 includes a joint 270 also at an inner end. Similarly, upper right suspension support arm 226 includes front and rear members 272, 274, which meet at apex 276 where they connect with upper right eyelet 278. Front member 272 includes a joint 280 at an inner end and rear member 274 includes a joint 282 also at an inner end.

At a point inward from apex 240, lower left suspension support arm 220 includes a left bracket 284 that is connected to and extends partially along front and rear members 236, 238. Similarly, lower right suspension support arm 222 includes a right bracket 286 that is connected to and extends partially along front and rear members 248, 250. Slidably attached to rear member 238 of lower left suspension arm 220 is a left pivot block 288. A right pivot block 290 is slidably attached to rear member 250 of lower right suspension support arm 222. A stabilizer bar 292 is connected between left and right pivot blocks 288, 290. Stabilizer bar 292 is adapted to slide and pivot by way of left and right pivot blocks 288, 290. These blocks 288, 290 slide relative to left and right lower suspension support arms 220, 222.

Stabilizer bar 292 helps reduces the pitching movement of the vehicle while cornering. While traversing uneven terain or cornering, one side of the vehicle suspension system 295 such as that shown in FIG. 21 may calapse, meaning the shock absorber 328 may be compressed, more than the shock absorber 326 on the oposite side of the vehicle. As left and right support arms 216, 218 of the suspension system 295 are calapsed unevenly, stablizer bar 292, due to its U-shaped geometry and attachments 293 which prevents bar 292 from moving horizontally, acts as a torsion spring, preferably made of steel, forcing the support arms 216 and 218 to remain relativly at the same position to the horizontal ground on which the vehicle is traveling. As would be recognized by one skilled in the art, pivot blocks 288, 290 need not be attached to the lower suspension arms 238 and 250 as in the prefered embodiment in order to function properly. Pivot blocks 288, 290 could also be attached to any one suspension arm on support arm 216 and to any one suspension arm on support arm 216.

In a situation where support arms 216 begins to calapse but support arms 218 remain uncalapsed, which may occur while support arms 216 encounters unever terrain or cornering, stabilizer bar 292 will undergo a twisting motion due to its attachment to pivot block 288. As supports arms 216 continue to calapse, the twisting of stabililzar bar 292 thus increases and at the same time stabilizer bar 292 increases the lifting force applied to pivot block 290 which in turn tends to raise the support arms 218. Pivot blocks 288, 290 are constructed to pivot and slide along support arms 216 and 218 and also to slidingly recieve stabilizer bar 292. This construction allows the stabilizer bar to produce only a lifting force on the support arms 218 so that it will pivot about points 256, 258, 280 and 282. As would be recognized by one skilled in the art, the same sequent of events would produce the same effect if the support arms 218 were to be calapsed to a greater extend than support arms 216.

Left and right bushings 296, 298 are provided to allow some rotation of the components of front suspension 110. Left and right ski legs 208, 210 rotatably connect to front suspension 110 for facilitating movement of skis 32.

FIG. 16 illustrates sub-frame 294, which is essentially a unitary, V-shaped structure. Sub-frame 294, which forms a part of front suspension 110, includes a central channel 300 flanked on either side by left and right upwardly extending panels 302, 304. Left upwardly extending panel 302 includes a left lower panel 306 connected to left transition structure 308 and left triangular panel 310. Similarly, right upwardly extending panel 304 includes a right lower panel 312 connected to right transition structure 314 and right triangular panel 316. While sub-frame 294 preferably is a unitary structure (an integrally-formed structure), sub-frame 294 need not be constructed in this manner. As would be understood by those skilled in the art, sub-frame 294 may be assembled from a number of separate elements that are connected together by any suitable means such as by welding or by fasteners.

As illustrated in FIG. 17, sub-frame 294 is an integral part of front suspension 110 and connects to left support arm 216 and right support arm 218 through a number of brackets 318 connected at various locations on sub-frame 294.

Figure 18:
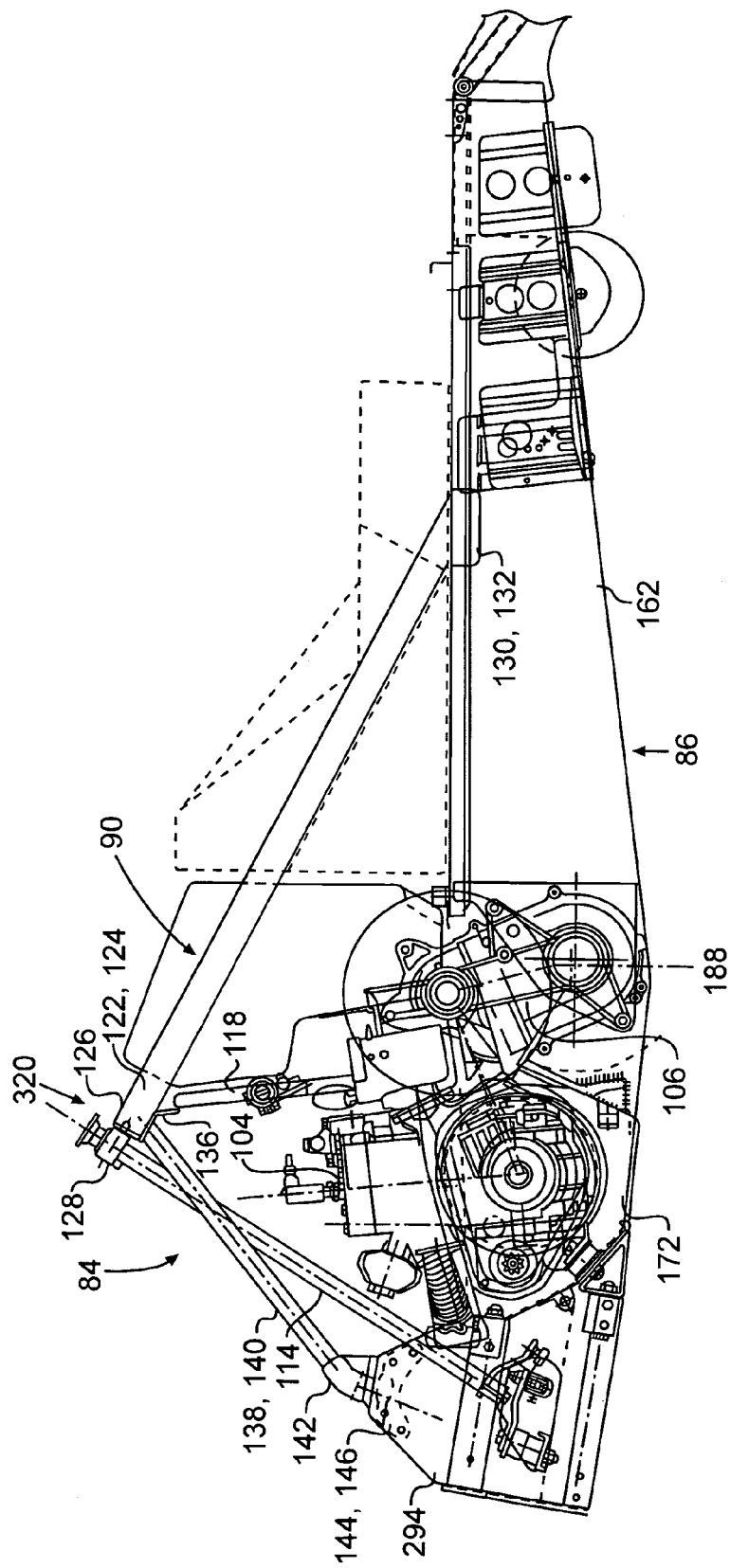
FIG. 18 is a side view schematic of the frame assembly of the present invention showing the positional relationship between the frame assembly and the engine, among other components.

FIG. 18 is a side view of one embodiment of the completed frame assembly 84 of the present invention. As shown, over-arching frame elements 90 are connected between tunnel 86 and sub-frame 294 to establish an apex 320 to which steering shaft 114 is connected.

Figure 19:
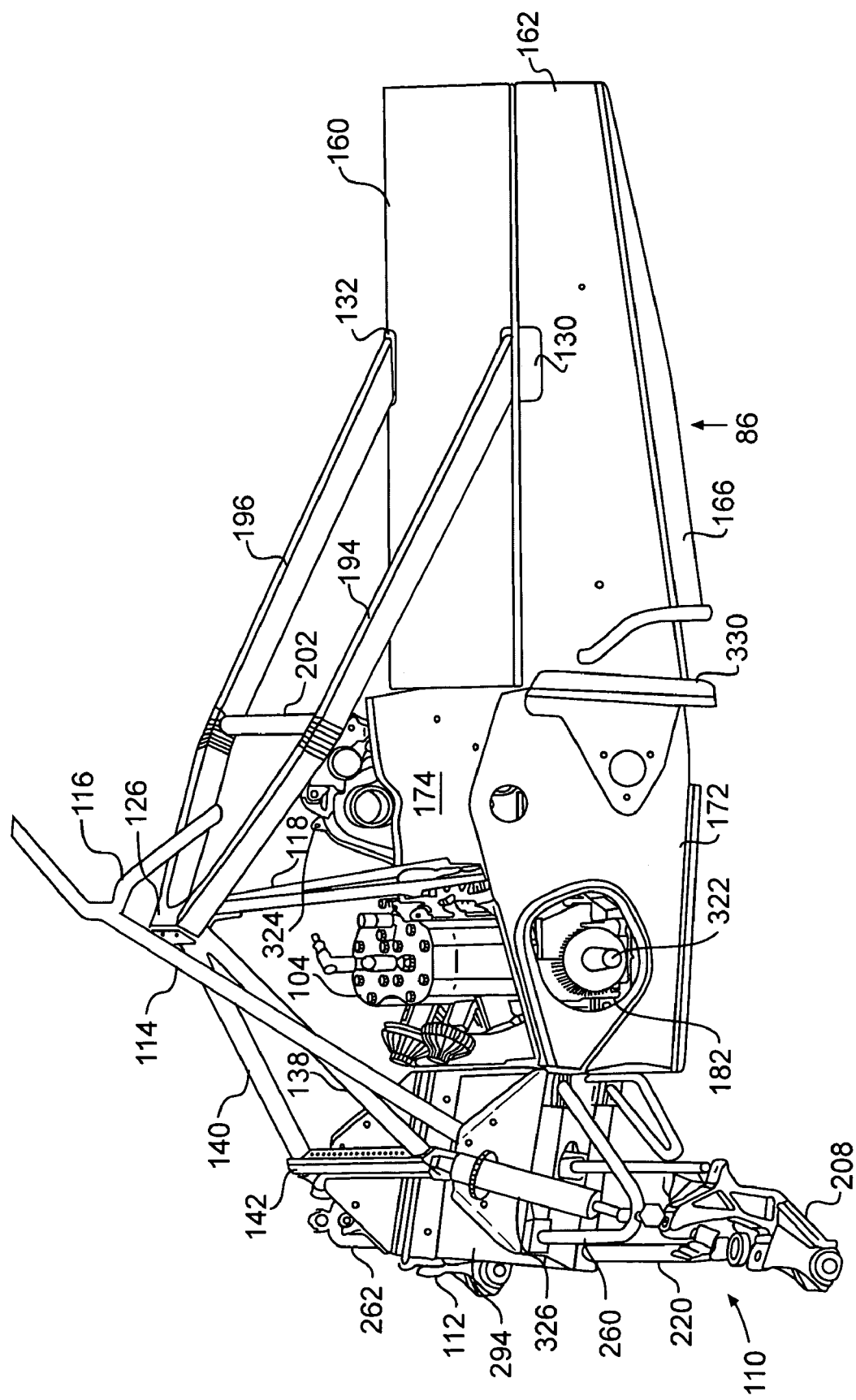
FIG. 19 is a perspective illustration, from the left side, of the frame assembly according to the teachings of the present invention, also showing the positional relationship between the frame assembly, the engine, and the front suspension.

FIG. 19 is a perspective illustration of the embodiment of the present invention shown in FIGS. 13 and 14 to assist in understanding the scope and content of the present invention. As illustrated, drive shaft 322 extends through left opening 182 in left engine cradle wall 172. A portion of gearbox 324 is also visible. In addition, left shock absorber 326, which is connected between cross-member 142 and left support arm 216, is illustrated. Right shock absorber 328, which extends between cross-member 142 and right support arm 218 is visible in FIG. 20. Furthermore, left forward foot wall 330 is shown at the forward end of left foot rest 166. A similar forward foot wall may be provided on the right side of snowmobile 22 (but is not illustrated herein).

Figure 20:
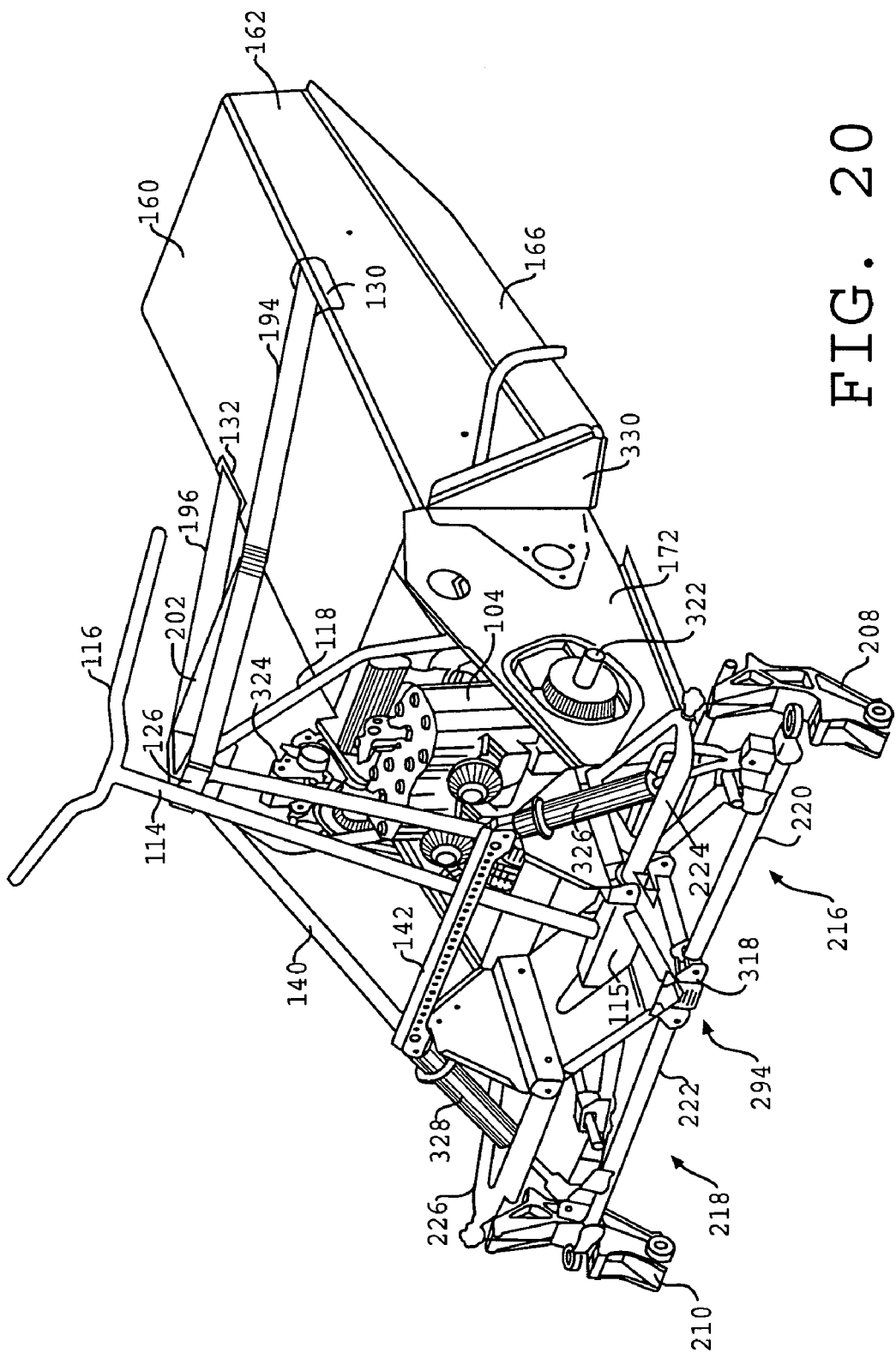
FIG. 20 is another perspective illustration, from the front left side, of the combined frame assembly and tunnel portion constructed according to the teachings of the present invention, also showing the positional relationship between the frame assembly, the engine, and the front suspension.
Figure 21:
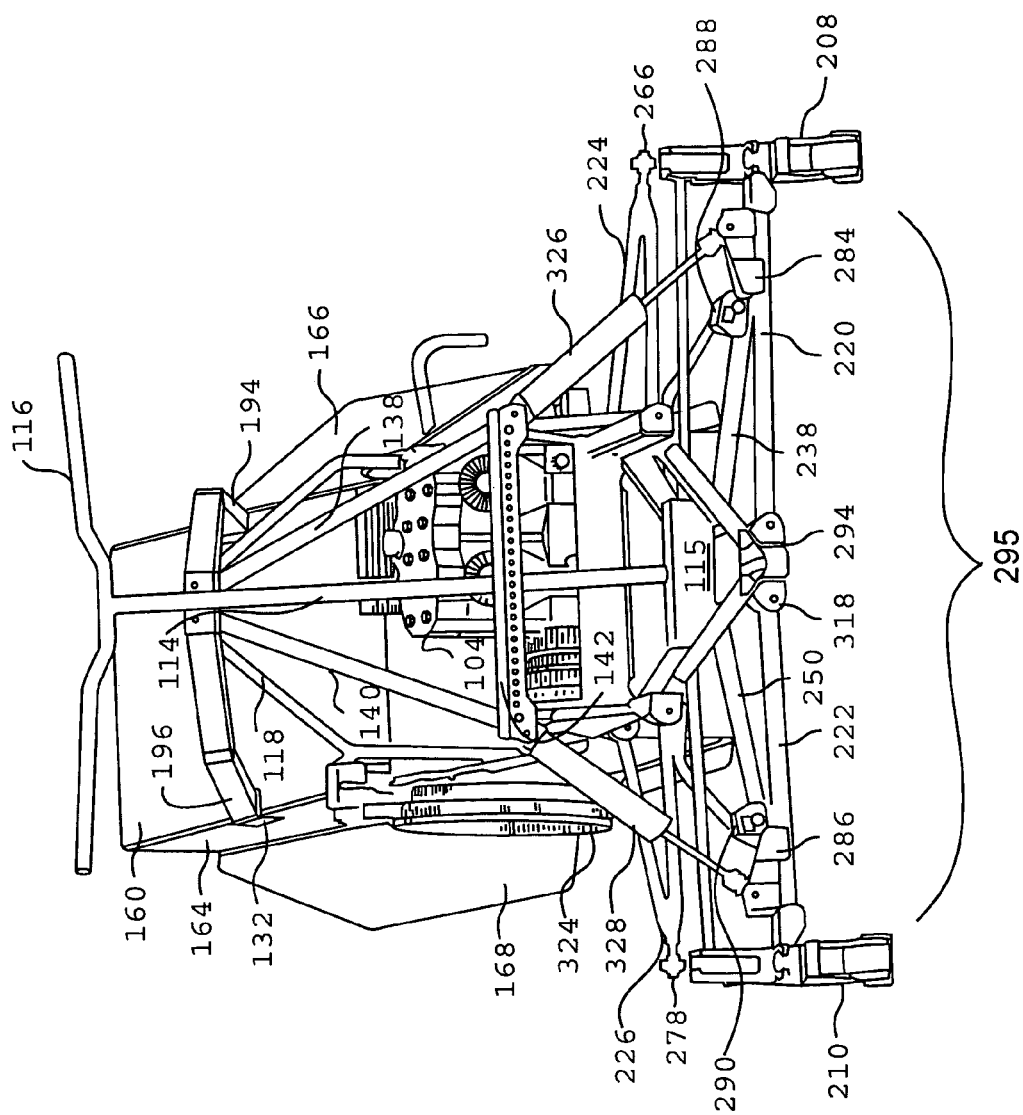
FIG. 21 is a front perspective illustration of the embodiment depicted in FIG. 20.
Figure 22:
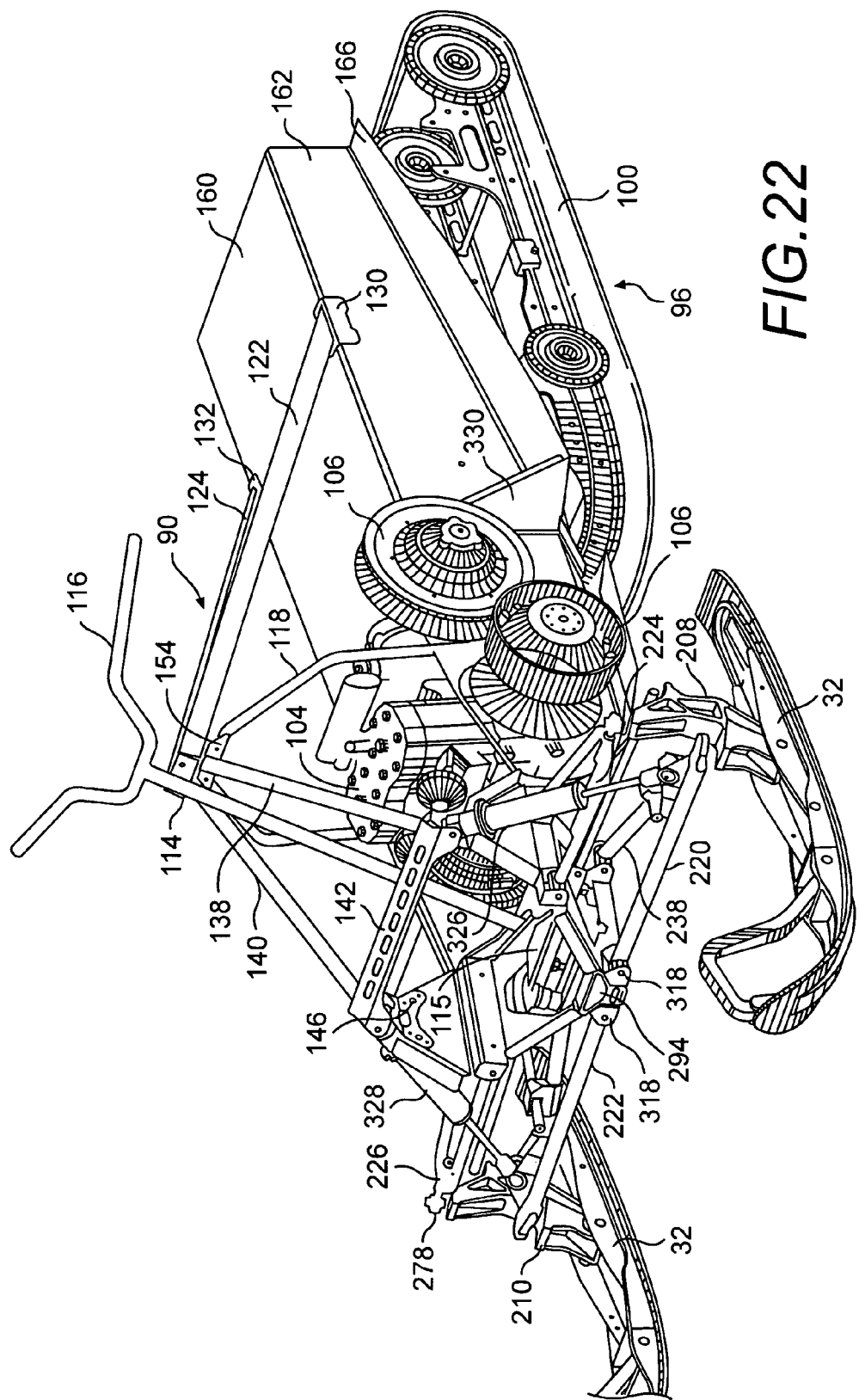
FIG. 22 is a perspective illustration of a slightly different embodiment from the one depicted in FIG. 20.

FIGS. 20 and 21 illustrate further details of the present invention by showing the various elements from slightly different perspective views. FIG. 22 illustrates the modified version of the elements of the present invention shown in FIGS. 6 and 7. Here, left and right braces 122, 124 are illustrated instead of left and right braces 194, 196. As discussed previously, left and right braces 122, 124 differ from left and right braces 194, 196 in that they are not bent but, instead, are straight elements of overarching frame 90. The same left and right braces 122, 124 are shown in FIG. 18. As would be understood by those skilled in the art, the two different embodiments of these braces are interchangeable. In addition, their shape may be altered depending on the requirements of the particular vehicle design, as would be understood by those skilled in the art.

Left and right braces 194, 196 are bent to accommodate an airbox (not shown) between them. Left and right braces 122, 124 are not bent because they do not need to accommodate an airbox.

FIG. 20 also illustrates steering gear box 115 at the bottom end of steering shaft 114 that translates the movement of handlebars 116 into a steering motion of skis 32.

FIGS. 23–27 illustrate alternate embodiments of the present invention that are designed for a wheeled vehicle 332, rather than a snowmobile 22. For the most part, the elements designed for wheeled vehicle 332 are the same as those for snowmobile 22, except for those elements required to attach wheels 334 to wheeled vehicle 332.

In the preferred embodiment of wheeled vehicle 332, the vehicle includes two front wheels 334 and a single rear wheel 336. As would be understood by those skilled in the art, however, wheeled vehicle 332 may be constructed with two rear wheels rather than one. If so, wheeled vehicle 332 would be a four-wheeled vehicle rather than the three-wheeled vehicle shown.

Wheeled vehicle 332 includes a seat 338 disposed over tunnel 86 in the same manner as snowmobile 22. The vehicle includes engine 104 at its forward end, encased by fairings 340. Fairings 340 protect engine 104 and provide wheeled vehicle 332 with an aesthetically pleasing appearance.

Engine 104 is connected to CVT 106, which translates the power from engine 104 into motive power for wheeled vehicle 332.

Figure 23:
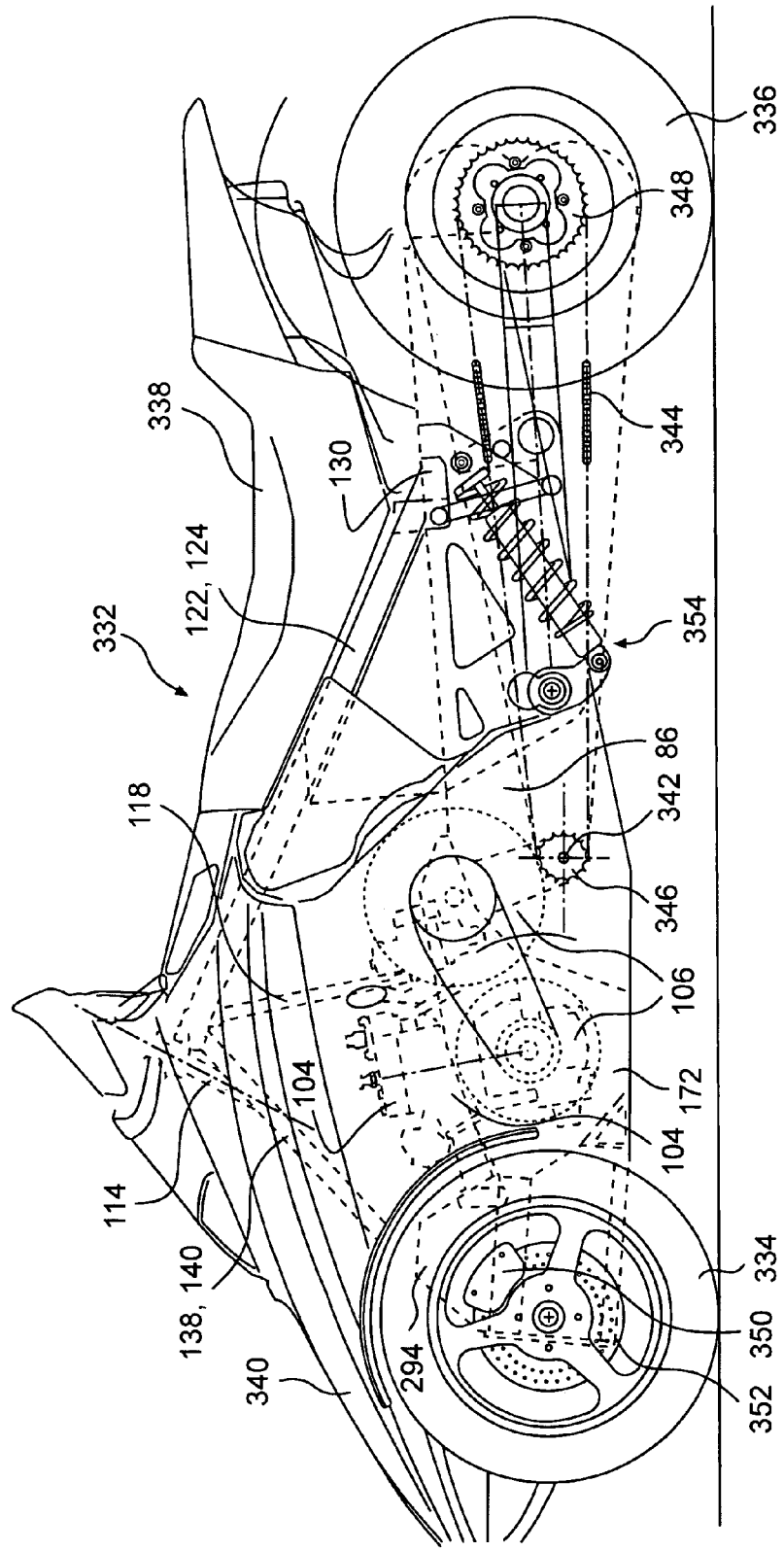
FIG. 23 is a schematic side view illustration of the frame assembly of the present invention as embodied in a wheeled vehicle.

As shown in FIG. 23, CVT 106 is connected by suitable means to drive shaft 342, which is connected to rear wheel 336 by a drive chain 344. A sprocket 346 is connected to drive shaft 342. A similar sprocket 348 is provided on the shaft connected to rear wheel 336. Drive chain 344 is an endless chain that connects sprockets 346, 348 to one another. To stop wheeled vehicle 332 during operation, disc brakes 350 are connected to front wheels 334. Disc brakes 350 clamp onto discs 352 to slow or stop wheeled vehicle 332 in a manner known to those skilled in the art.

A rear suspension 354 is provided under tunnel 86. Rear suspension 354 absorbs shocks associated with the terrain over which wheeled vehicle 332 travels. Rear suspension 354 replaces rear suspension 28 on snowmobile 22.

Figure 24:
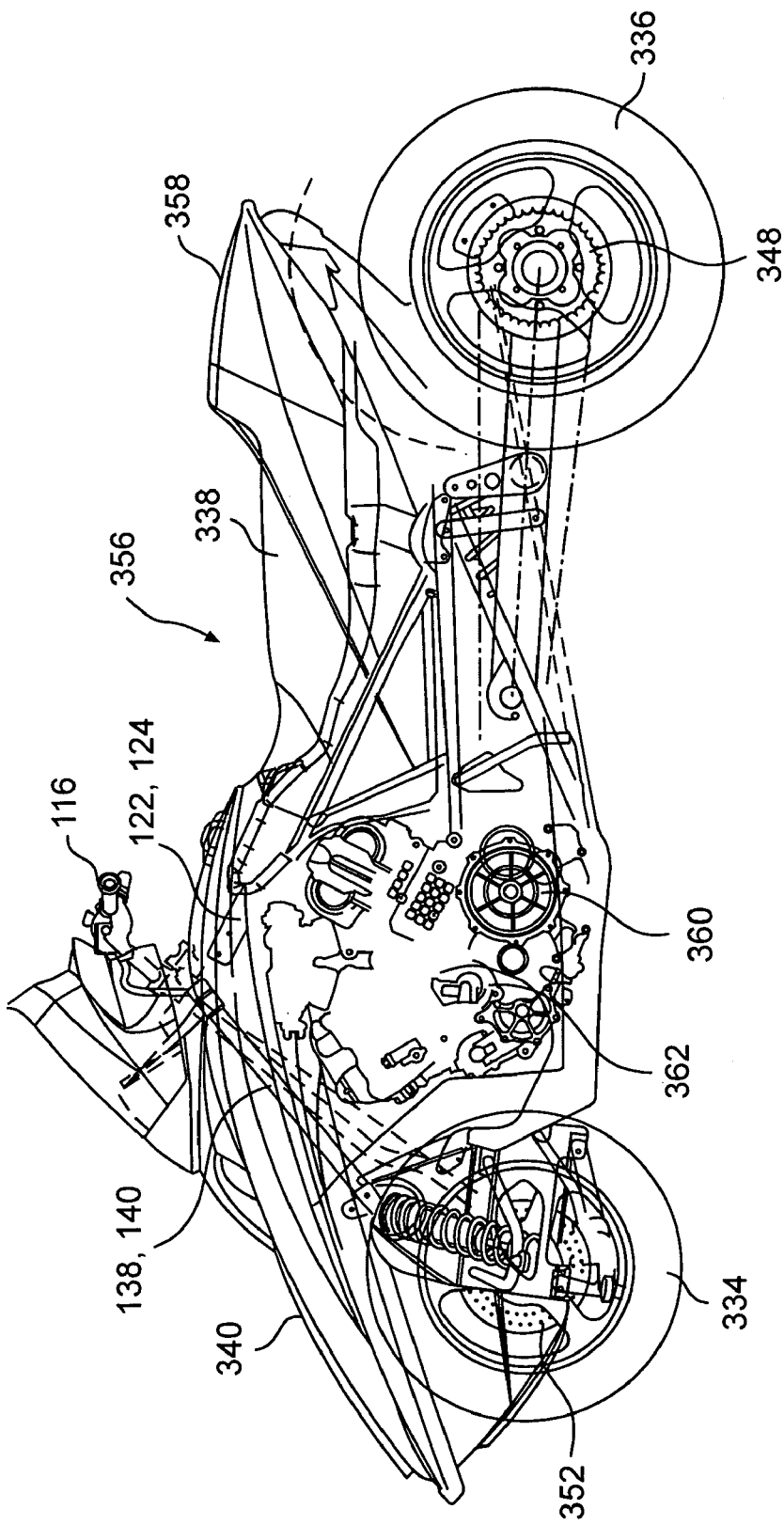
FIG. 24 is a schematic side view illustration of the frame assembly of the present invention as embodied in a slightly modified version of a wheeled vehicle.

FIG. 24 illustrates an alternate embodiment of wheeled vehicle 356. Wheeled vehicle 356 differs in its construction at the rear. Specifically, rear end 358 is shorter than that shown for wheeled vehicle 332. In addition, wheeled vehicle 356 includes a four stroke engine, rather than the two stroke engine 104 illustrated for wheeled vehicle 332. Also, wheeled vehicle 356 includes a manual speed transmission 360 (with a clutch) rather than continuously variable transmission 106, as illustrated with other embodiments of the present invention. Both constructions of the wheeled vehicle, as well as many other variations, are contemplated within the scope of the present invention. In addition, as discussed above, the present invention may be used with a two or four stroke engine (or any other type of engine that provides the motive power for the vehicle).

Figure 25:
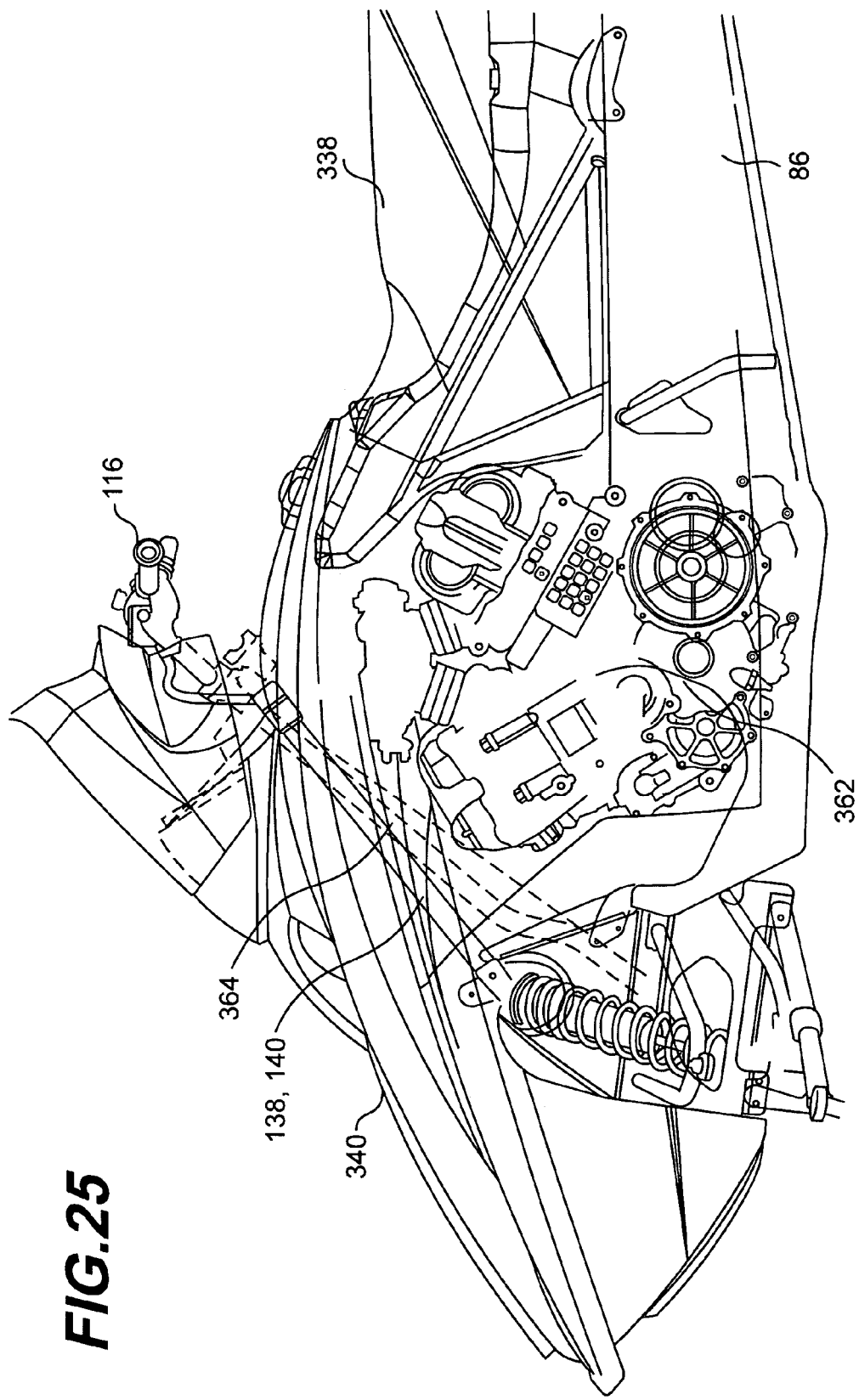
FIG. 25 is an enlarged side view illustration of the frame assembly of the present invention as embodied in the wheeled vehicle shown in FIG. 24.

FIG. 25 illustrates in greater detail the embodiment of the present invention shown in FIG. 24.

Figure 26:
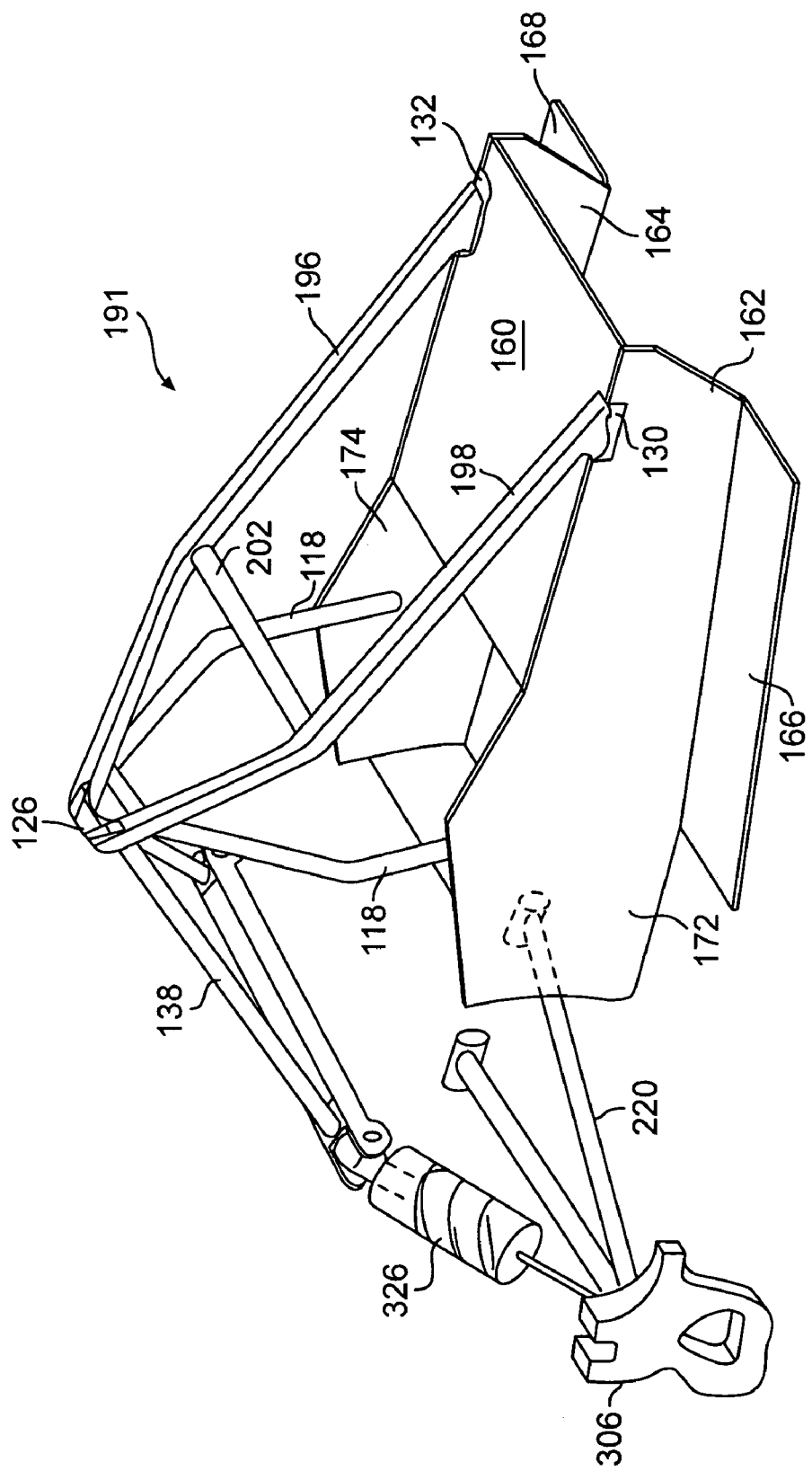
FIG. 26 is a perspective illustration, from the left rear, of the frame assembly of the present invention, showing some of the detail of the front suspension incorporated into the wheeled vehicle shown in FIGS. 23 and 24.
Figure 27:
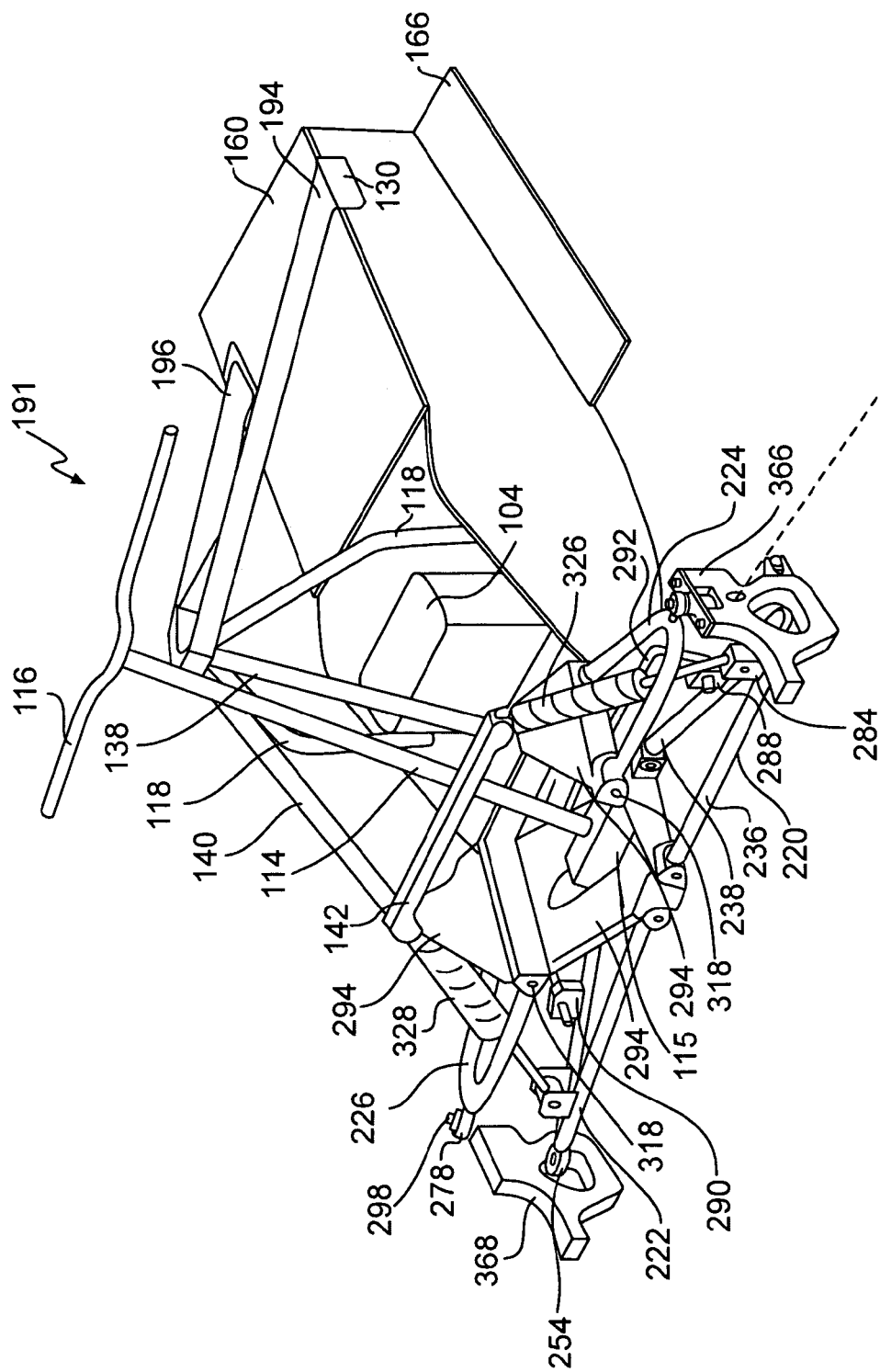
FIG. 27 is a perspective illustration, from the front left, showing the frame assembly of the present invention as depicted in FIG. 26.

FIGS. 26–27 illustrate the basic frame assembly contemplated for wheeled vehicles 332, 356. For either vehicle, the construction of frame assembly 191 is similar to that previously described. This embodiment differs in that left and right wheel knuckles 366, 368 are provided so that wheels 334 may be attached thereto. In most other respects, the construction of frame assembly 191 is the same as that previously described.

The variable geometry of steering shaft 364 will now be described in connection with FIGS. 28–34.

Figure 28:
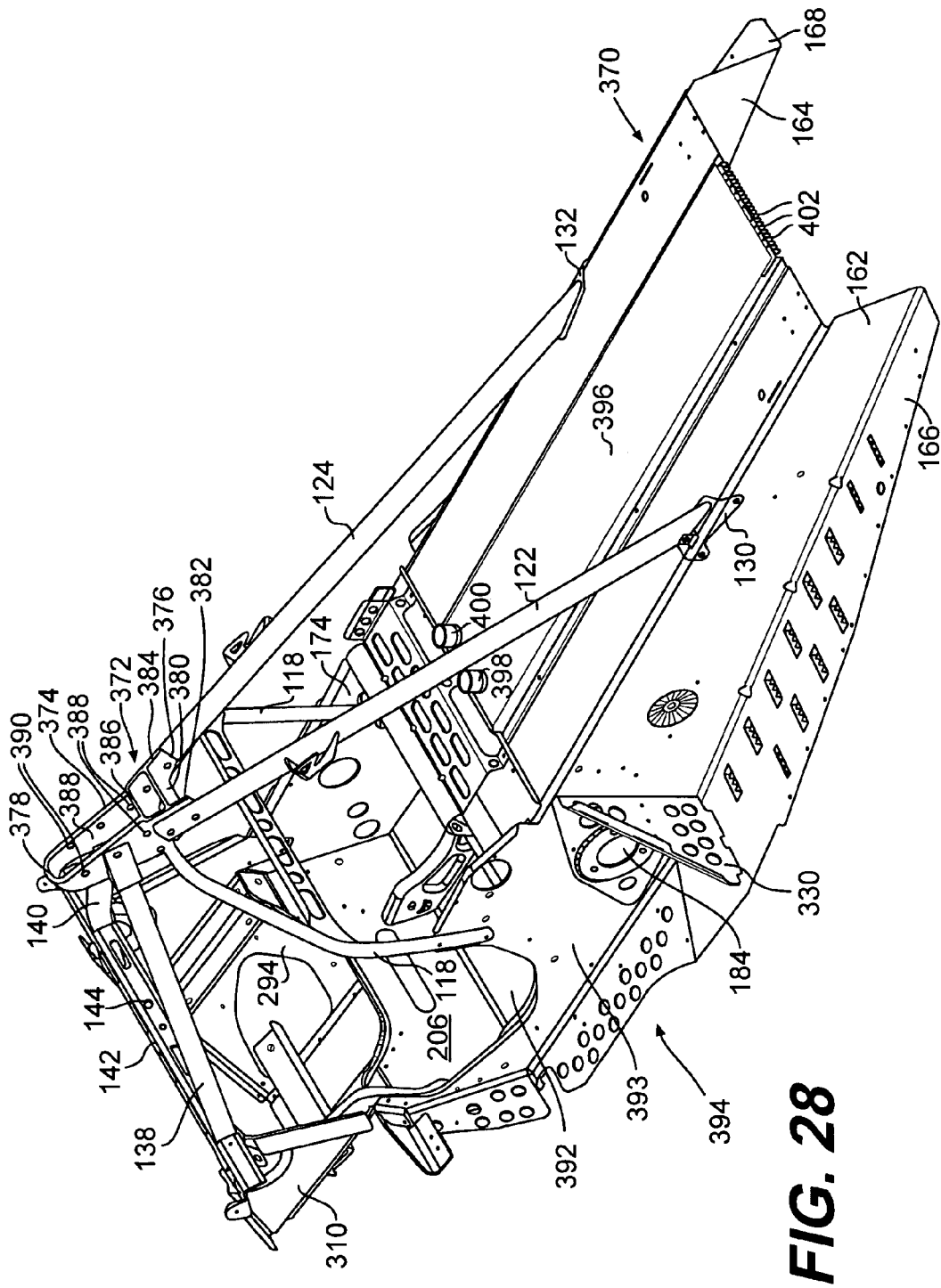
FIG. 28 is a perspective illustration, from the rear left side of an alternate embodiment of the frame assembly of the present invention.

As illustrated in FIG. 28, left brace 122 and right brace 124 extend upwardly from tunnel 370 to apex 372 where they connect to variable geometry steering bracket 374. Upper column 118 extends from left engine cradle wall 376 and right engine cradle wall 174 and also connects to variable geometry steering bracket 374. Forward support assembly 134 extends from sub-frame 294 to variable geometry steering bracket 374.

Figure 29:
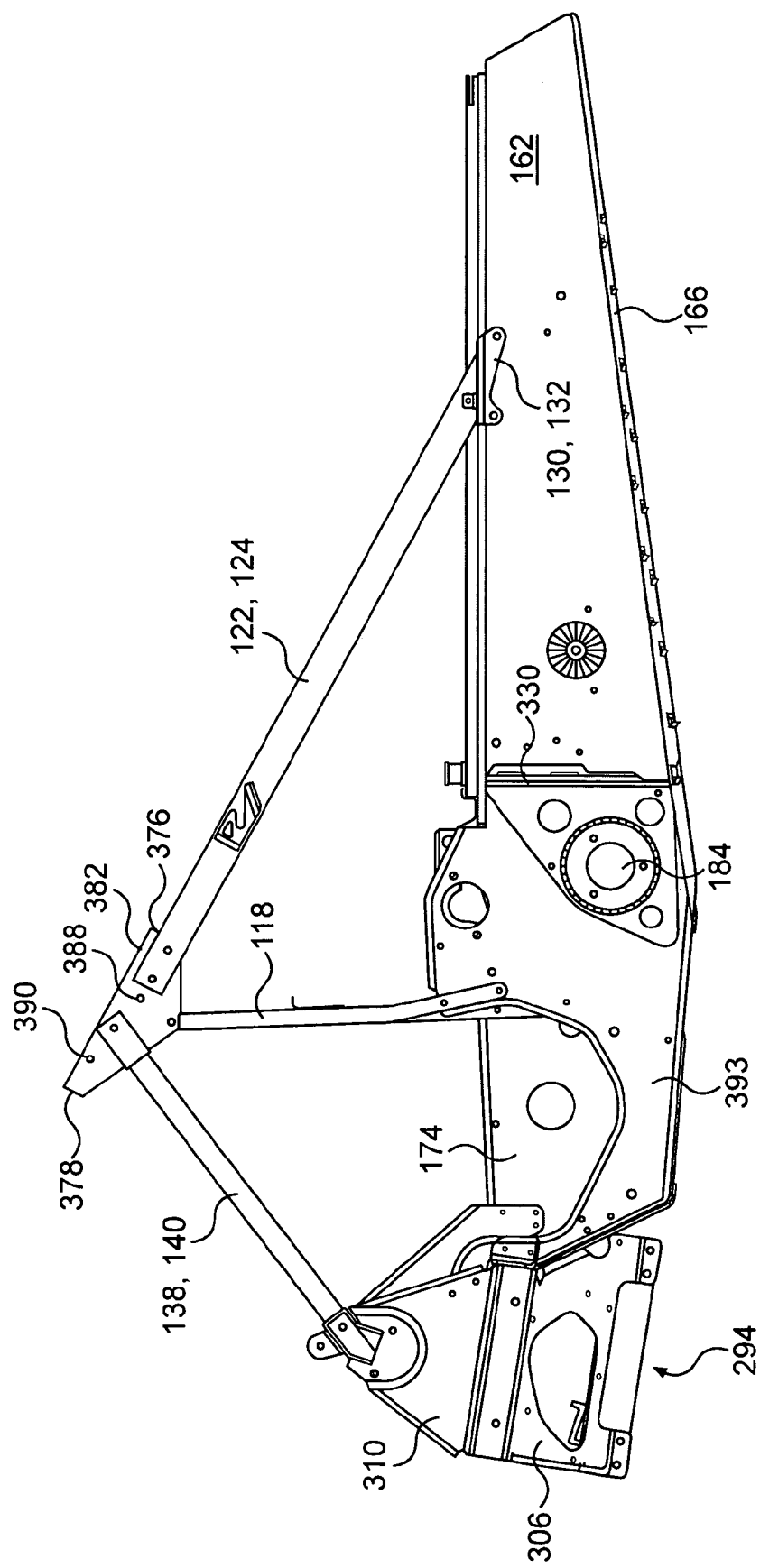
FIG. 29 is a side view illustration of the frame assembly shown in FIG. 28.
Figure 30:
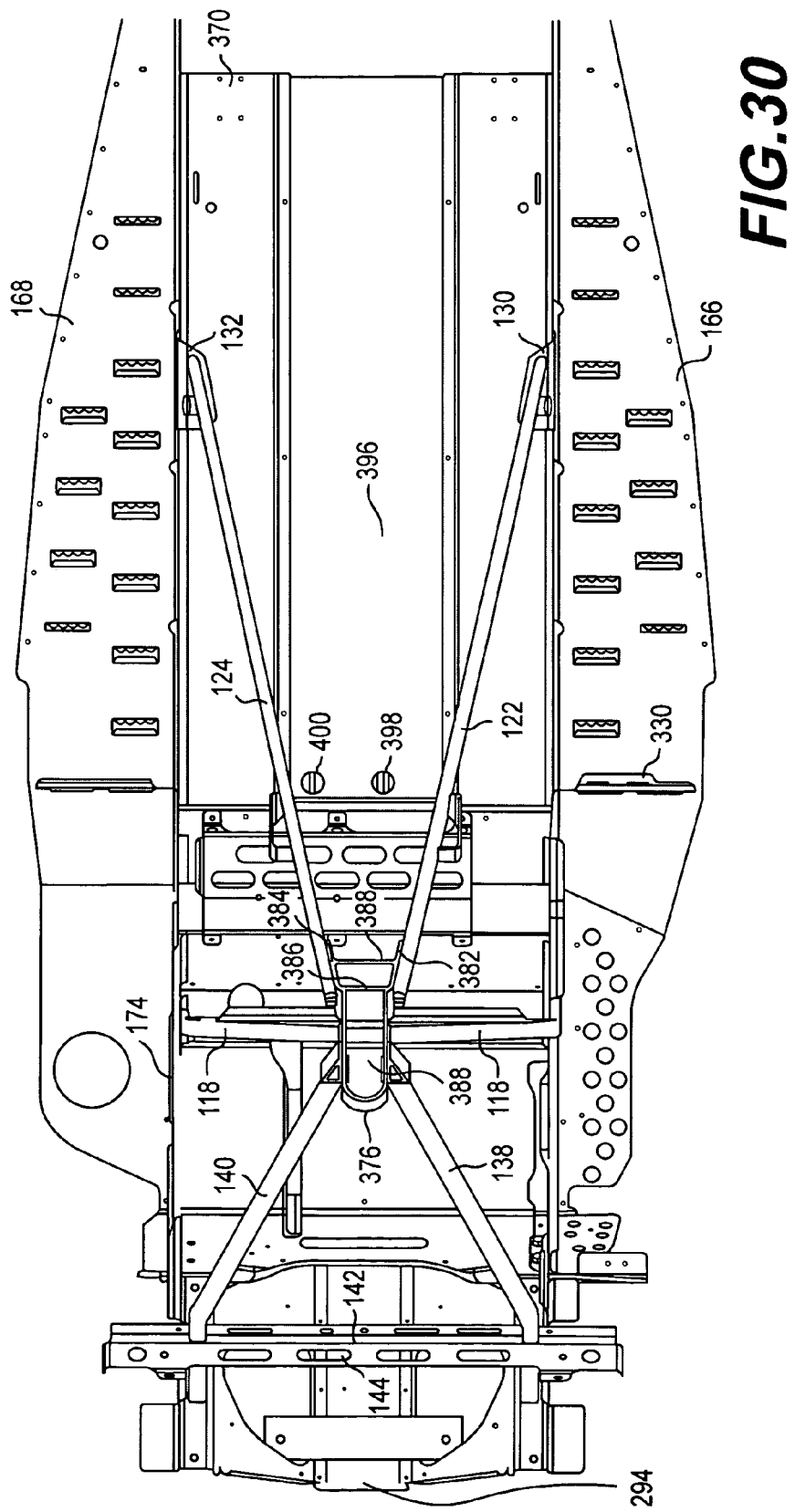
FIG. 30 is a top view of the frame assembly depicted in FIG. 28.

Variable geometry steering bracket 374 is essentially a U-shaped element with a rear end 376 and a forward end 378. At rear end 376, a first cross-member 380 extends between left and right legs 382, 384 of variable geometry steering bracket 374 to define a closed structure. A second cross member 386 extends between left and right legs 382, 384 forward of first cross member 380 and defines a U-shaped opening 387 toward forward end 378 of variable geometry steering bracket 374. A first pair of holes 388 and a second pair of holes 390 are disposed through left and right legs 382, 384 of variable geometry steering bracket 374 and provide separate attachment points for steering shaft 364. FIG. 29 illustrates the same structures in side view and FIG. 30 illustrates the same structures in top view.

Figure 31:
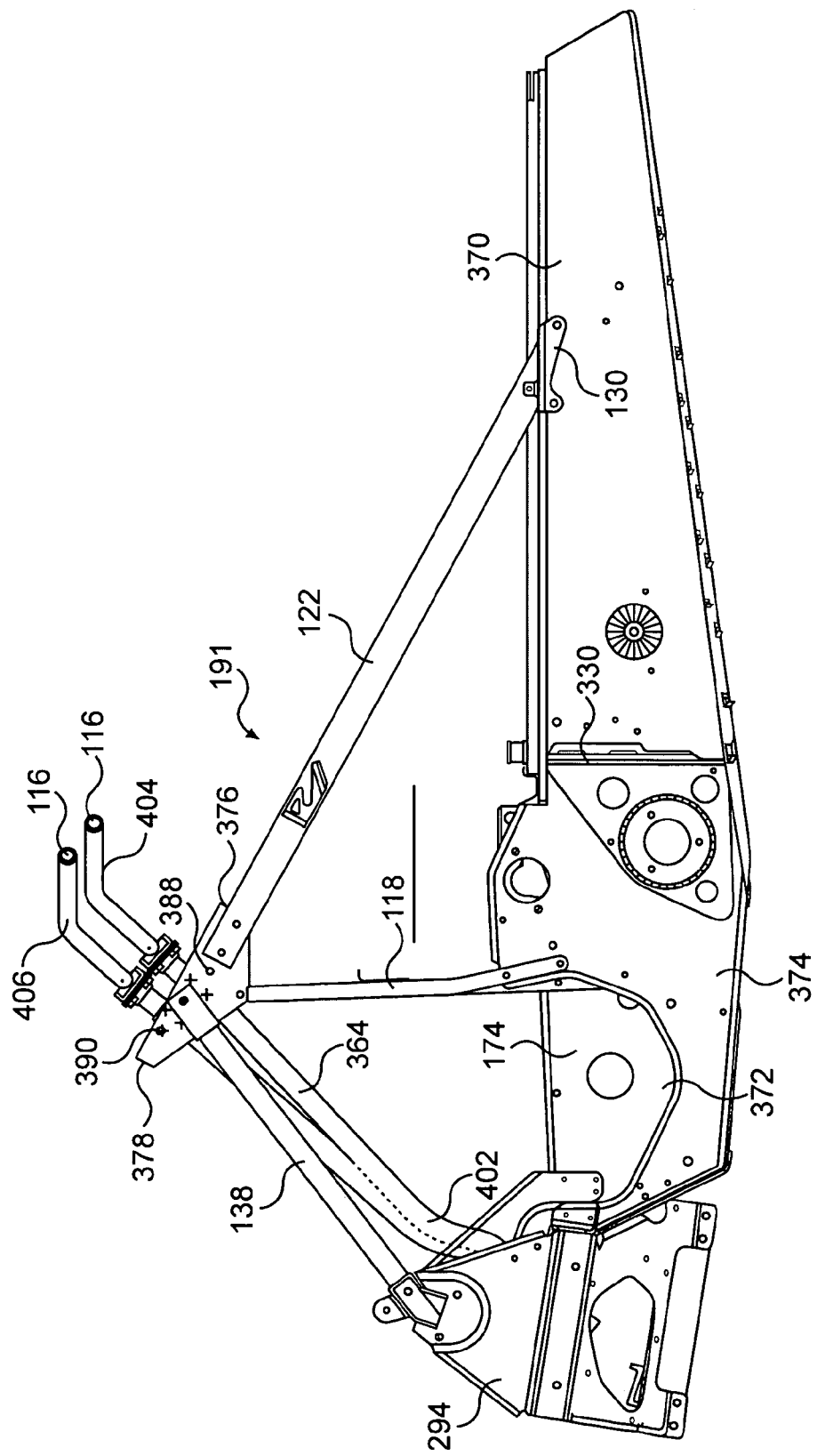
FIG. 31 is a side view illustration of the frame assembly shown in FIG. 29, illustrating the variable positioning of the handlebars that is possible with this embodiment of the present invention.

FIG. 31 provides another side view of the frame assembly of the present invention and illustrates the two positions of steering shaft 364 made possible by the construction of variable geometry steering bracket 374. To accommodate the variable geometry of steering shaft 362 and handlebars 116, steering shaft 364 includes a bend 402 at its lower end. Steering shaft 364 passes through a bearing or bushing (not shown) at its upper end that is connected to variable geometry steering bracket 374 at either of first or second pairs of holes 388, 390. By selecting either first or second pairs of holes 388, 390, first and second handlebar positions 404, 406 are selectable. As would be recognized by those skilled in the art, however, variable geometry steering bracket 374 may be provided with greater that two pairs of holes 388, 390 to further increase the variability handlebars 116. Also, variable geometry steering bracket 374 may be provided with a construction that permits infinite variation of the position of handlebars, as would be understood by those skilled in the art, should such a construction be desired.

Figure 32:
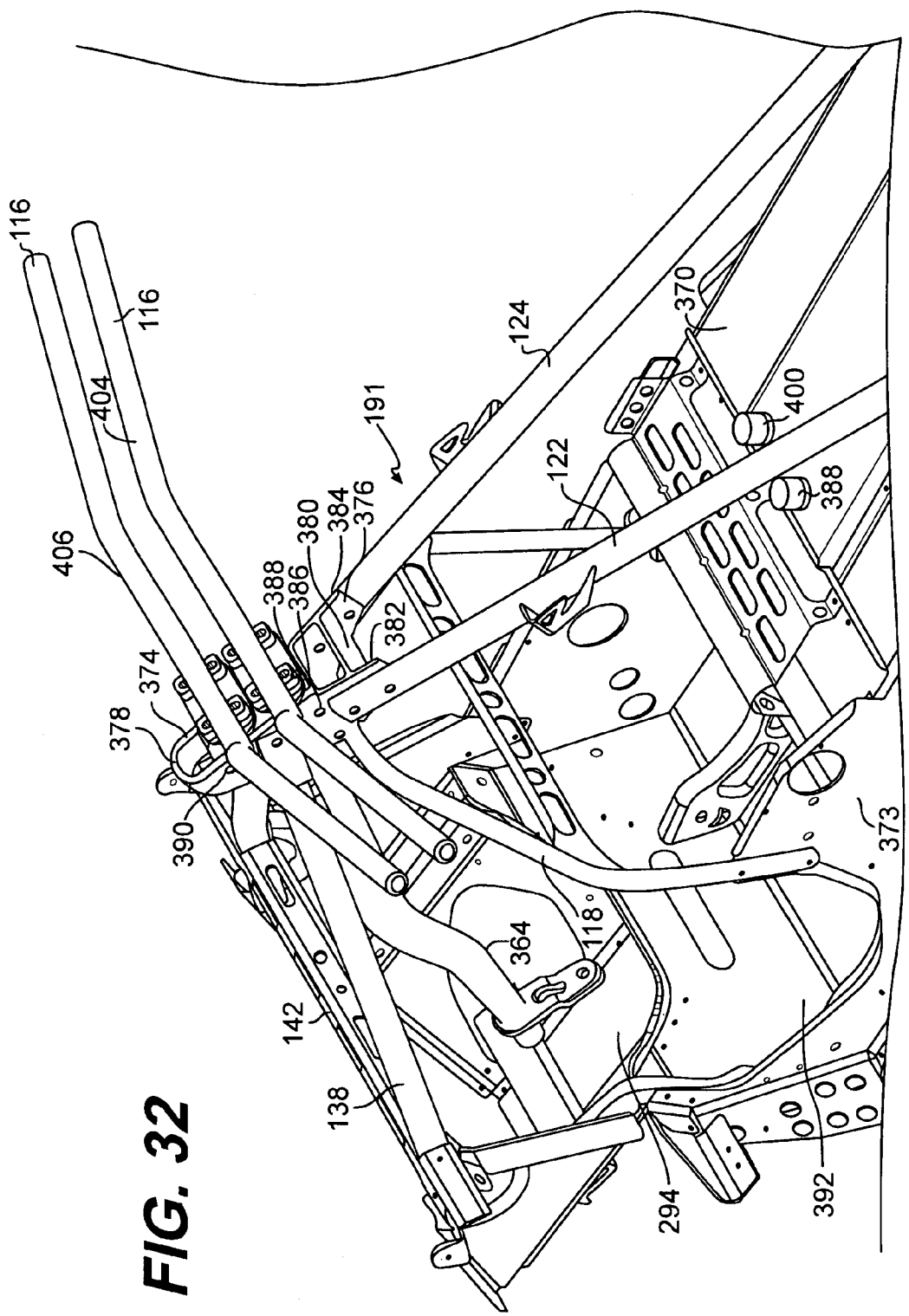
FIG. 32 is a perspective illustration of the embodiment shown in FIG. 31, showing in greater detail the variations in positioning of the handlebars that is made possible by the construction of the present invention.
Figure 33:
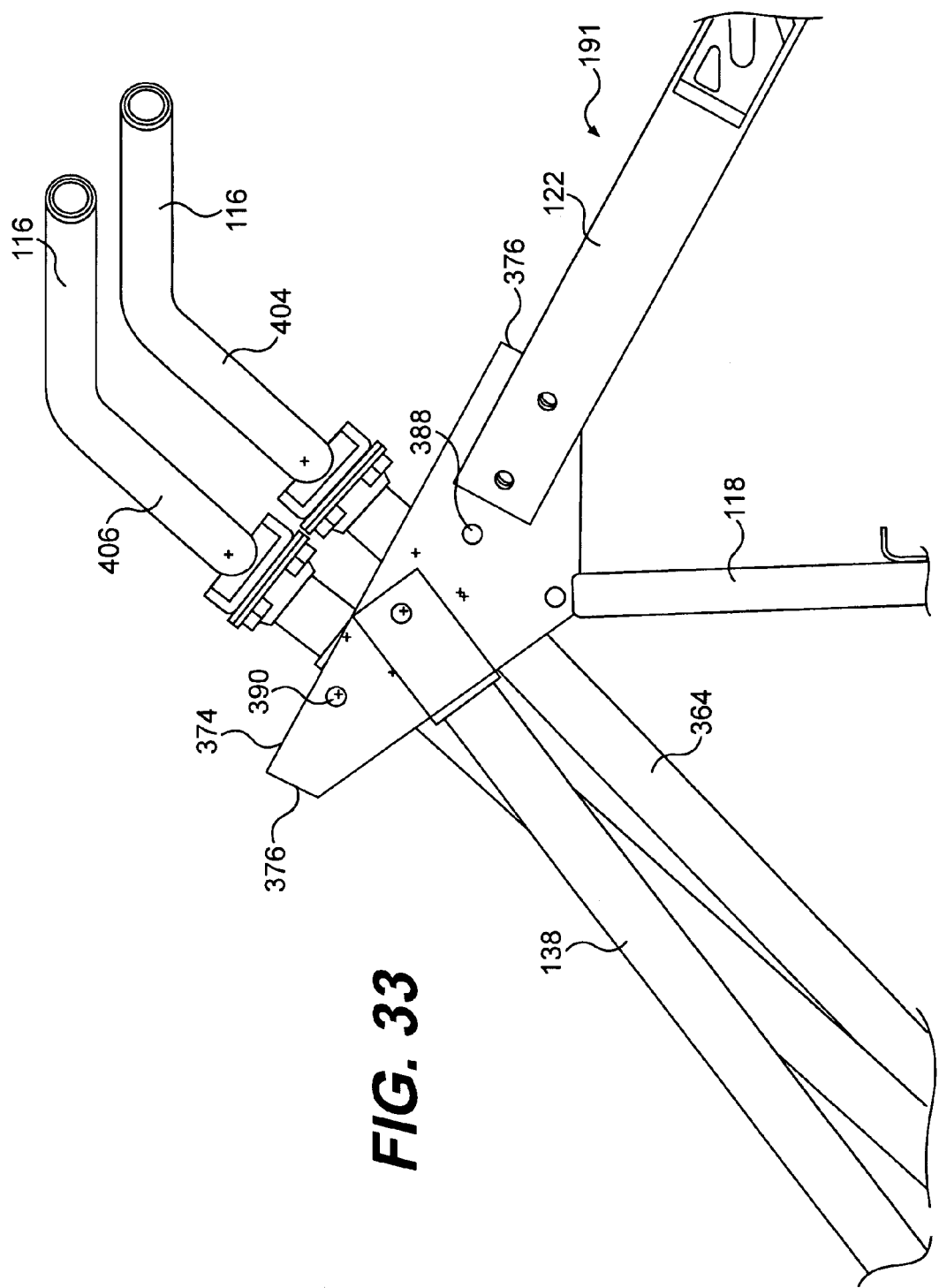
FIG. 33 is a close-up side-view detail of the connection point between the handlebars and the frame assembly of the present invention, illustrating the variable positioning of the handlebars.
Figure 34:
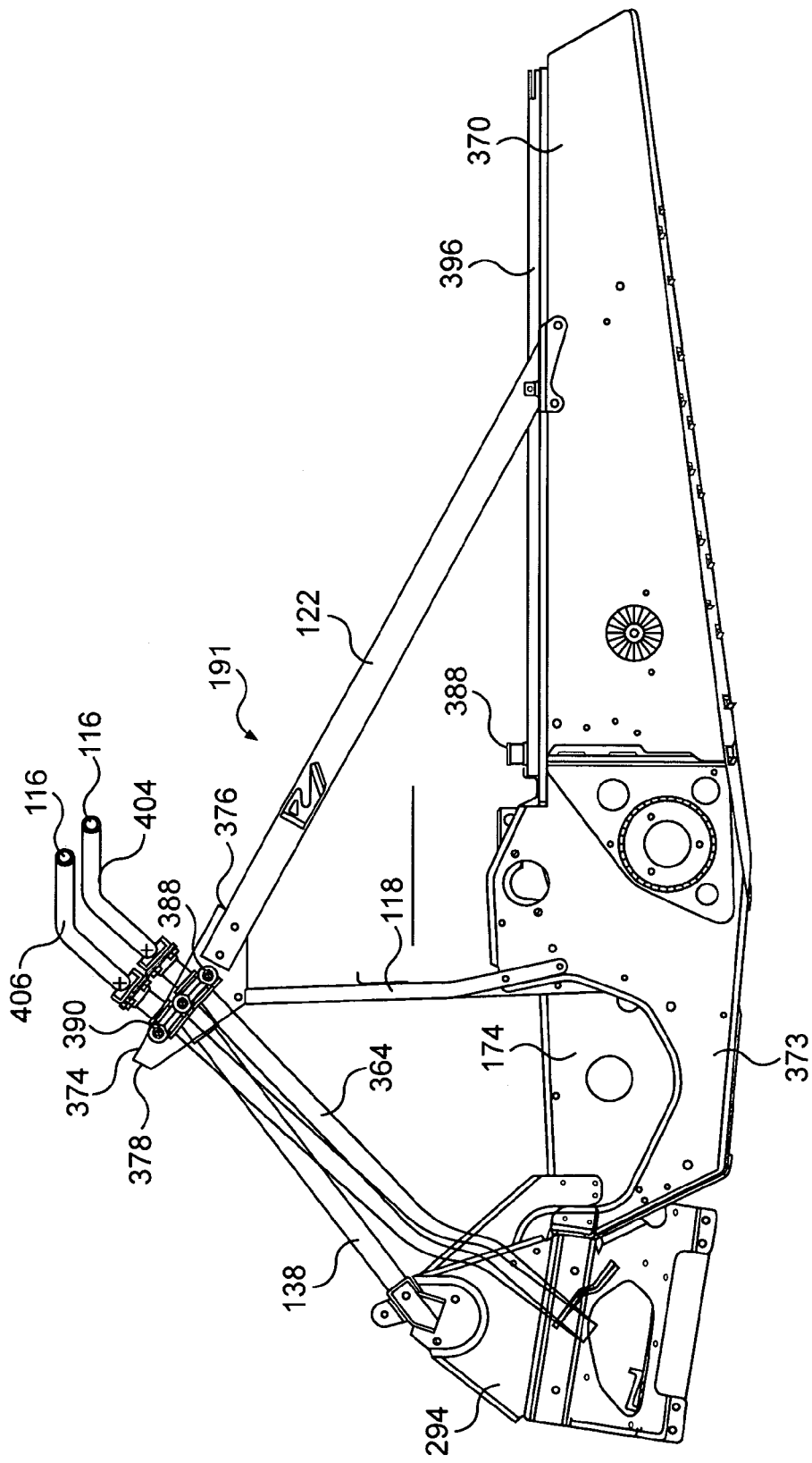
FIG. 34 is a further illustration of the variable positioning feature of the present invention.

FIGS. 32–34 provide additional views of the variable positioning of the handlebars 116 to facilitate an understanding of the scope of the present invention.

Frame assembly 84, 190, 191 of the present invention uniquely distributes the weight loaded onto the vehicle, whether it is snowmobile 22 or one of wheeled vehicles 332, 356. Each of the main components of the frame assembly 84, 190, 191 forms a triangular or pyramidal configuration. All of the bars of the frame assembly 84, 190, 191 work only in tension and compression, without bending. Therefore, each bar of frame assembly 84, 190, 191 intersects at a common point, the bracket 126 (in the non-variable steering geometry) or variable geometry steering bracket 374. With this pyramidal shape, the present invention creates a very stable geometry.

Specifically, the structure of frame assembly 84, 190, 191 enhances the torsional and structural rigidity of the frame of the vehicle. This improves handling. Usually, with a snowmobile, there is only a small torsional moment because the width of the snowmobile is only about 15 inches. An ATV, on the other hand, has a width of about 50 inches and, as a result, experiences a significant torsional moment. Therefore, to construct a frame assembly that is useable in either a snowmobile or an ATV, the frame must be able to withstand the torsional forces associated with an ATV.

Not only does frame assembly 84, 190, 191 reduce torsional bending, it also reduces the bending moment from front to rear. The increased rigidity in both directions further improves handling.

In addition, the creation of frame assembly 84, 190, 191 has at least one further advantage in that the frame can be made lighter and stronger than prior art frame assemblies (such as frame assembly 52, which is illustrated in FIG. 4). In the conventional snowmobile, frame assembly 52 included a tunnel 54 and an engine cradle 56 that were riveted together. Because frame assembly 84, 190, 191 adds strength and rigidity to the overall construction and absorbs and redistributes many of the forces encountered by the frame of the vehicle, the panels that make up the tunnel 86 and the engine cradle 88 need not be as strong or as thick as was required for the construction of frame assembly 52.

In the front of the vehicle, left and right shock absorbers 326, 328 are connected to forward support assembly 134 so that the forces experienced by left and right shock absorbers 326, 328 are transmitted to frame assembly 84, 190, 191. In the rear of the vehicle, the left and right braces 122, 124 are orientated with respect to the rear suspension. Upper column 118 is positioned close to the center of gravity of the vehicle's sprung weight. The sprung weight equals all of the weight loaded onto the vehicle's entire suspension. The positioning of these elements such that they transmit forces encountered at the front, middle and rear of the vehicle to an apex creates a very stable vehicle that is capable of withstanding virtually any forces that the vehicle may encounter during operation without sacrificing vehicle performance.

Figure 35:
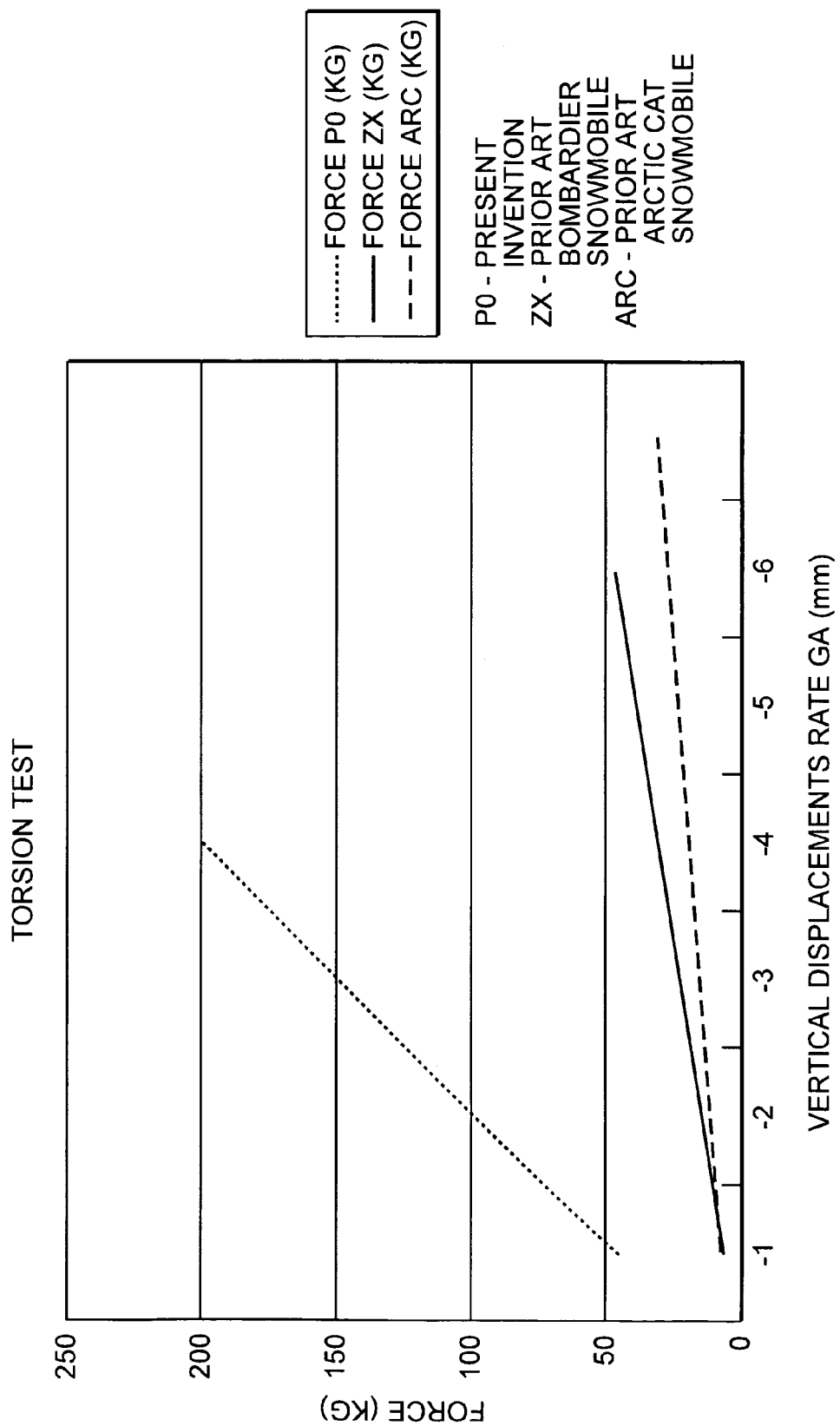
FIG. 35 is a graph showing the vertical displacement rate of the frame of the present invention in comparison with a prior art Bombardier snowmobile (the ZX™ series) and a prior art snowmobile made by Arctic Cat.

FIG. 35 illustrates the degree to which the rigidity of a frame constructed according to the teachings of the present invention is improved. The test illustrated here is known as a three-point test because three points on the frame are held in a fixed position and a fourth point is subjected to a measurable force. The displacement of the frame under a particular load is measured. The smaller the distance that the frame moves under a given stress, the greater is the rigidity of that frame.

Here, the highest line on the graph illustrates that for a 100 kg load, the vertical displacement of the frame of the present invention is only −2 mm. However, in the prior art Bombardier ZX™ model snowmobile, a load of only 50 kg produced a vertical displacement of −6 mm. In addition, a load of about 30 kg on the frame for the prior art Arctic Cat® snowmobile produced a vertical displacement of −6 mm. In other words, the structural rigidity of the frame assembly of the present invention is greatly improved.

Other aspects of the present invention will now be described in connection with FIGS. 27–38.

In each of the embodiments illustrated throughout the Figures, left leg 148 of upper column 118 attaches to the interior surface of right engine cradle wall 174. Right leg 150 of upper column 118 attaches to the exterior surface of left engine cradle wall 393. In this arrangement, upper column 118 may be detached from engine cradle 394 and removed easily by sliding upper column 118 from engine cradle 394 through C-shaped opening 392.

This embodiment of the frame assembly of the present invention differs from the previous embodiments in a few respects. First, left engine cradle wall 393 includes a C-shaped opening 392 instead of opening 182. C-shaped opening 392 facilitates maintenance of an engine (not shown) in engine cradle 394, because it facilitates access to the engine from the left side, which is the side to which the engine sits within engine cradle 394. Second, an elongated radiator 396 is integrated into tunnel 370. Radiator 396 includes an inlet 398 and an outlet 400 that are connected to the cooling system of the engine to assist in reducing the temperature of the coolant therein. To facilitate dissipation of heat, radiator 396 includes fins 402 on its underside.

Tunnel 370 and engine cradle 394 are constructed so that they form an integral unit, once assembled. The combined tunnel 370 and engine cradle 394 are essentially made up of three parts, a left side structure 408, a right side structure 410, and radiator 396. Left side structure 408 is the combination of left engine cradle wall 393 and left side plate 162. Right side structure is the combination of right engine cradle wall 174 and right side plate 164. In addition, front wall 206 and engine cradle bottom 207 also form a part of the combined structure made by tunnel 370 and engine cradle 394.

Left side structure 408 and right side structure 410 are stamped from a single sheet of metal. The rear portion of left side structure 408 is then bent at right angles to left side plate 162 to form a left top portion 412 of tunnel 370. Similarly, the rear portion of right side structure 410 is bent at right angles to right side plate 164 also to form a right top portion 414 of tunnel 370. Radiator 396 extends between left top portion 412 and right top portion 414 and connects left side structure 408 to right side structure 410.

Because left side structure 408 and right side structure 410 are stamped from a single sheet of metal at the same time, they are "self-aligning". What this means is that the holes through left engine cradle wall 393 and right engine cradle wall 174 are aligned with one another and do not require any additional reworking during the manufacture. This saves considerable effort in manufacture because time is not wasted trying to align left engine cradle wall 393 with right engine cradle wall 174.

Figure 36:
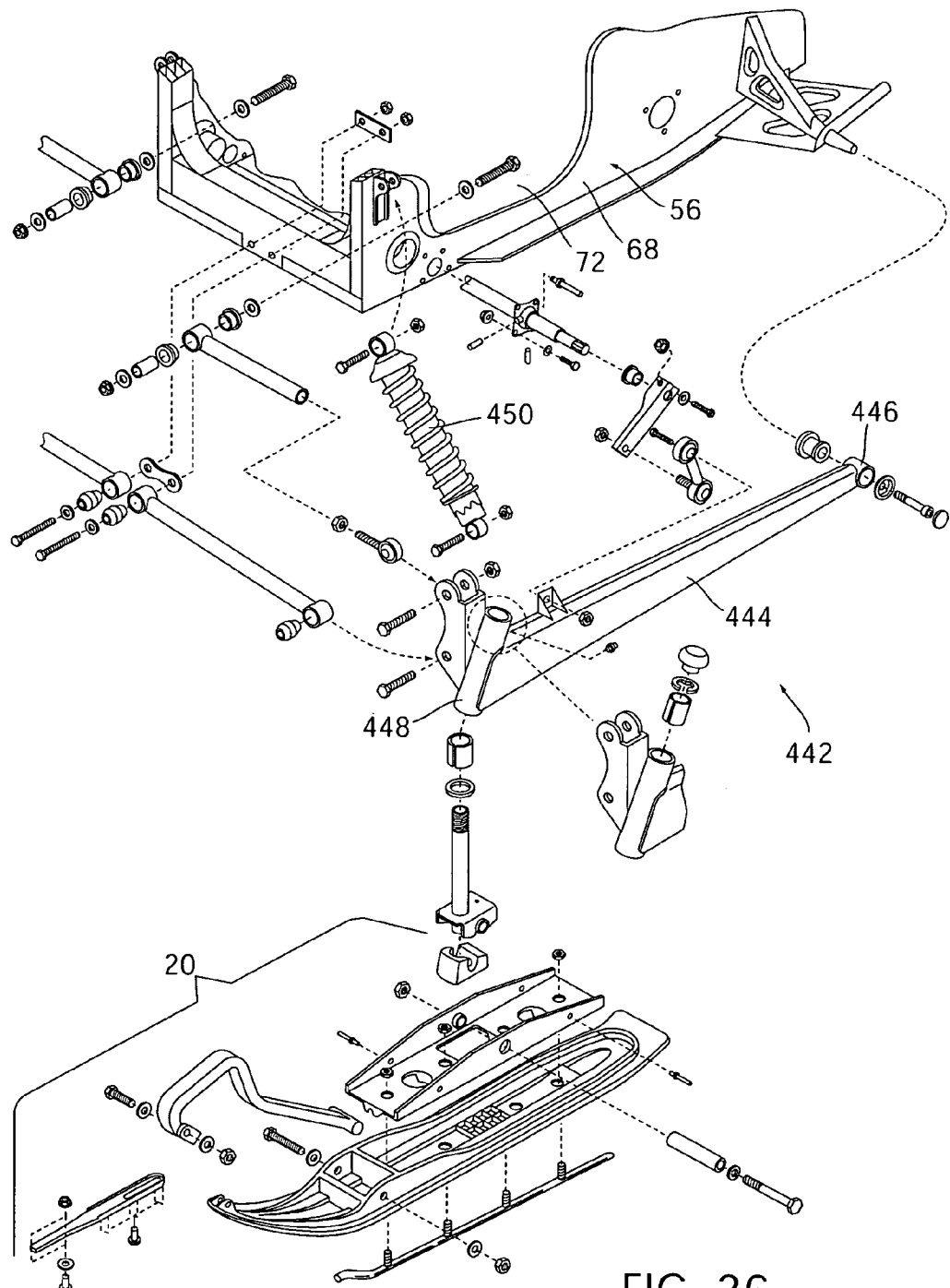
FIG. 36 is an exploded perspective of a trailing arm front suspension for the Mach 1 R™ snowmobile (model year 2000) made by Bombardier Inc. of Montréal, Québec, Canada.
Figure 37:
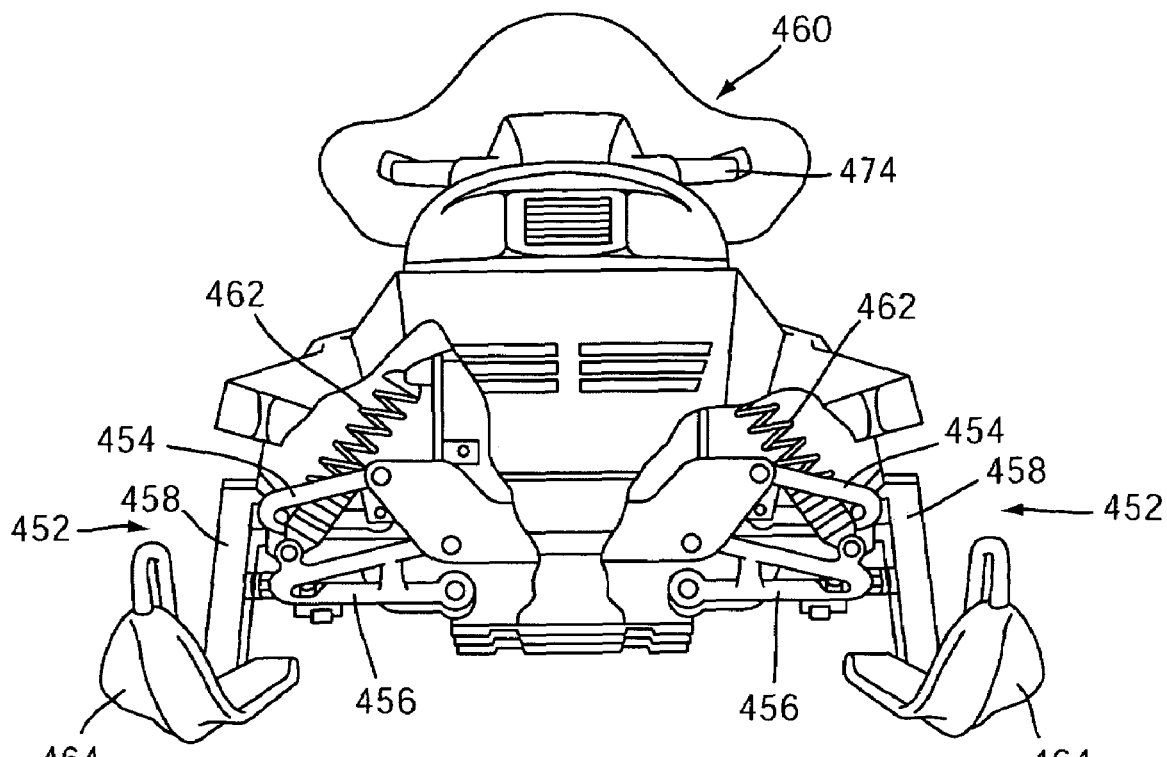
FIG. 37 is a front view of a snowmobile patented in part by Arctic Cat in U.S. Pat. No. 5,664,649, which illustrates a double A-arm front suspension typical in the prior art.
Figure 38:
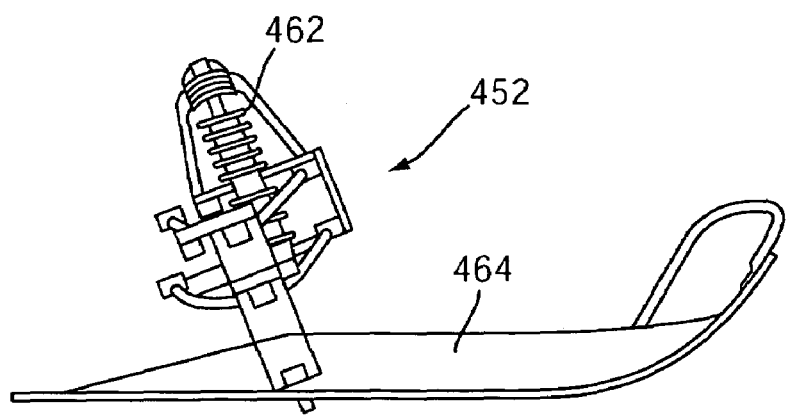
FIG. 38 is a side view a portion of the front suspension illustrated in FIG. 37, showing certain aspects of the front suspension in greater detail.
Figure 39:
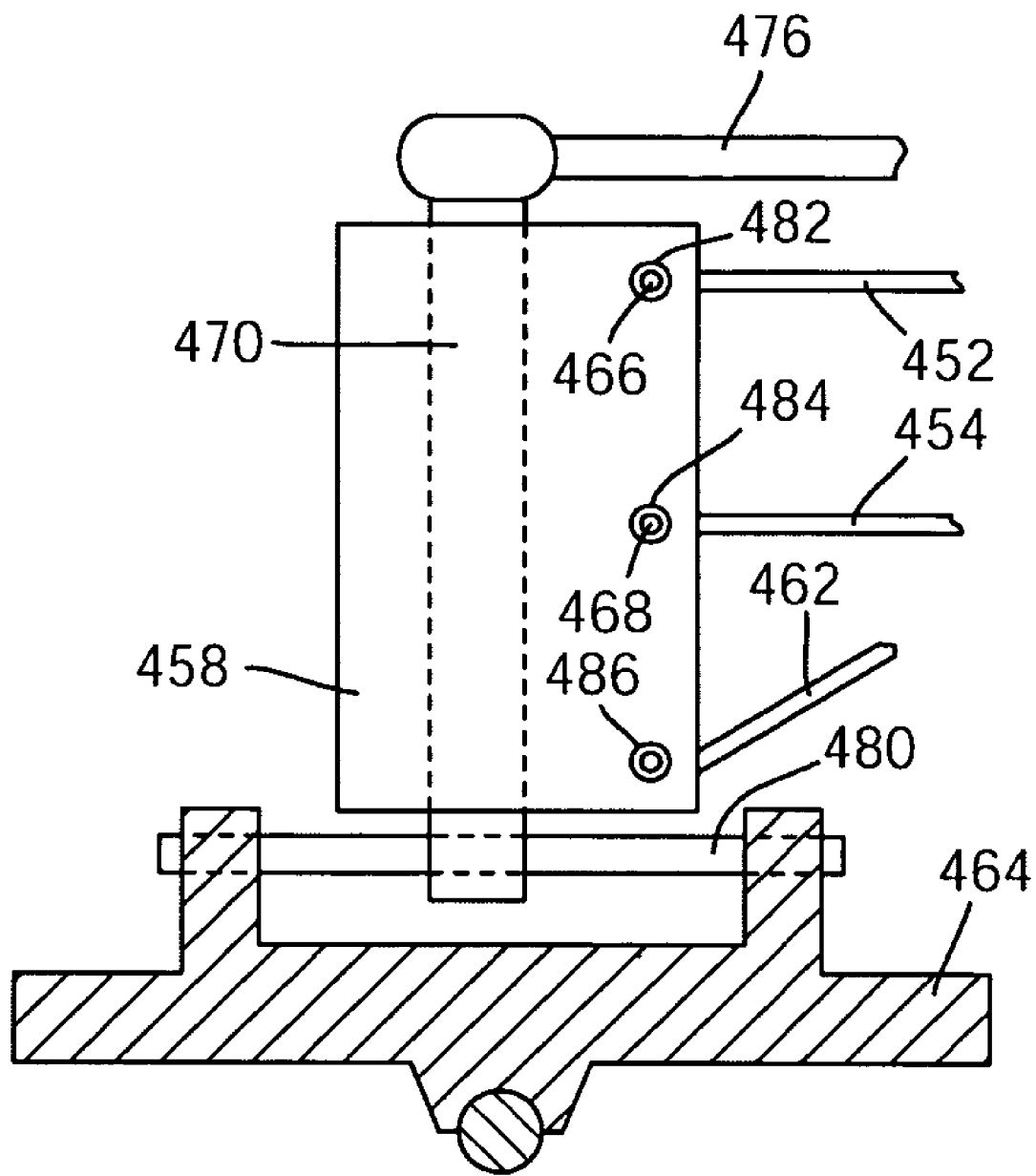
FIG. 39 is a front view illustration of a simplified drawing of another embodiment of the double A-arm front suspension of the type illustrated in FIG. 37.
Figure 40:
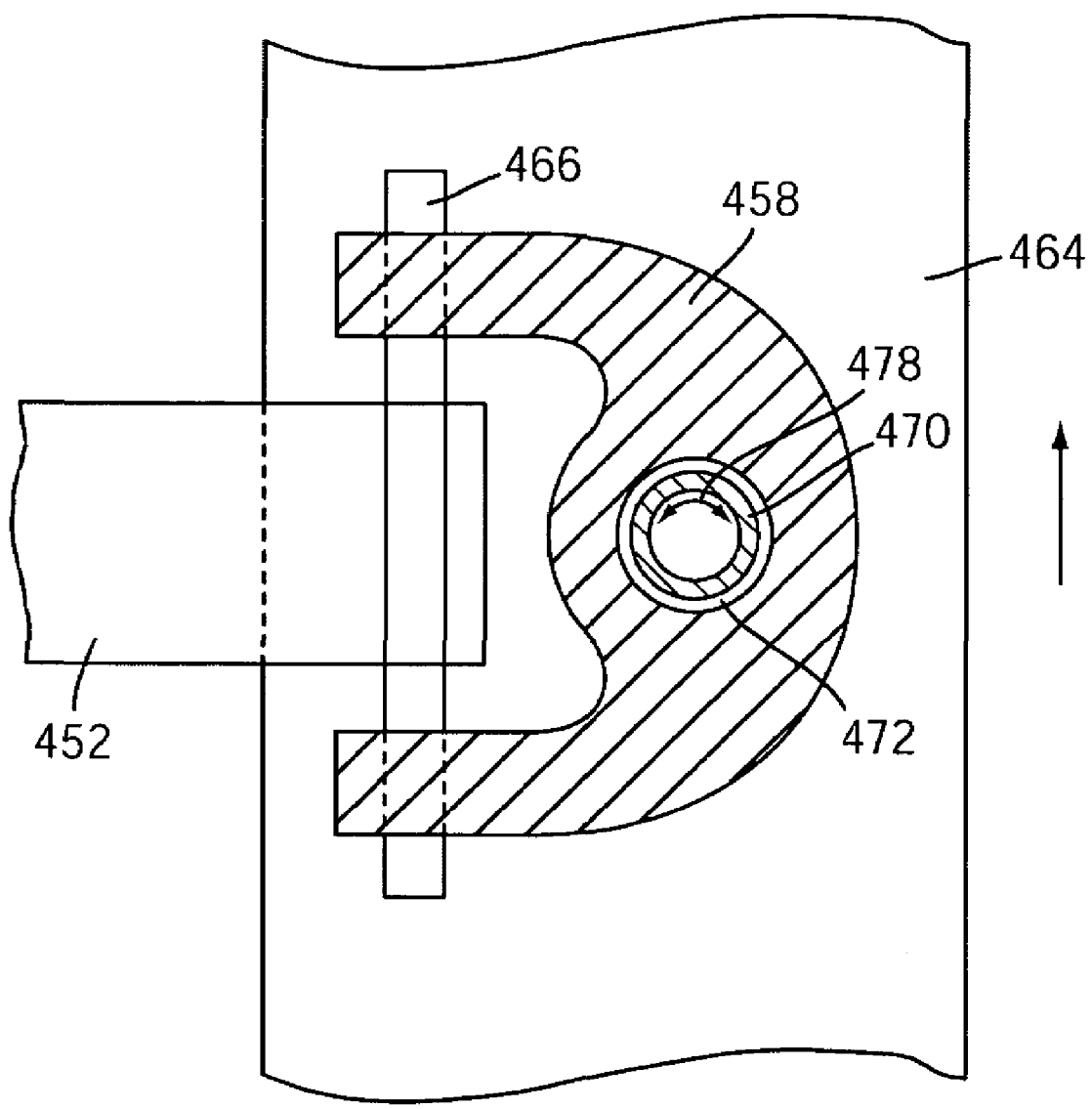
FIG. 40 is a top view of the simplified drawings of the double A-arm suspension illustrated in FIG. 39.

In addition, because radiator 396 connects left side structure 408 with right side structure 410 in the manner shown, additional space is created on tunnel 370 for a larger fuel tank 416 (shown in dotted lines in FIG. 18). As illustrated in FIG. 36, fuel tank 416 has an inverted U-shaped appearance so that it "drapes" over radiator 396. On its bottom, tank 416 includes two downwardly-extending sections 418, 420 that provide an increased fuel capacity to fuel tank 416. Depending upon the height of radiator 396, the amount of fuel 422 that may be contained in tank 416 may be significantly increased. In the embodiment shown, height 424 is approximately 17 mm.

Because the frame assembly 84 is designed to absorb and transfer energy for the frame, the thickness of left engine cradle wall 393 and right engine cradle wall 174 need not be as great as was required in the prior art construction (see, e.g., FIG. 4). Specifically, the construction of the engine cradle 56 in the prior art required a plate thickness of approximately 2.58 mm. With the frame assembly 84, however, the plate thickness for engine cradle 394 may be reduced to less than about 2.5 mm. More preferably, the thickness my be reduced to about 2.0 mm, which results in a significant weight savings.

In addition, engine cradle 56 included a forward wall 57 that was an extruded element so that forward wall 57 would be thick enough and strong enough to withstand the magnitude of forces exerted upon it. With the construction of engine cradle 394, however, front wall 206 does not need to be a thick, extruded element. Instead, front wall 206 may be a piece stamped from a metal sheet, just like left side structure 408 and right side structure 410. Similarly, engine cradle bottom 207 may also be stamped from a sheet of metal.

The details of the front suspension of the present invention will now be described in connection with FIGS. 41–43.

Figure 41:
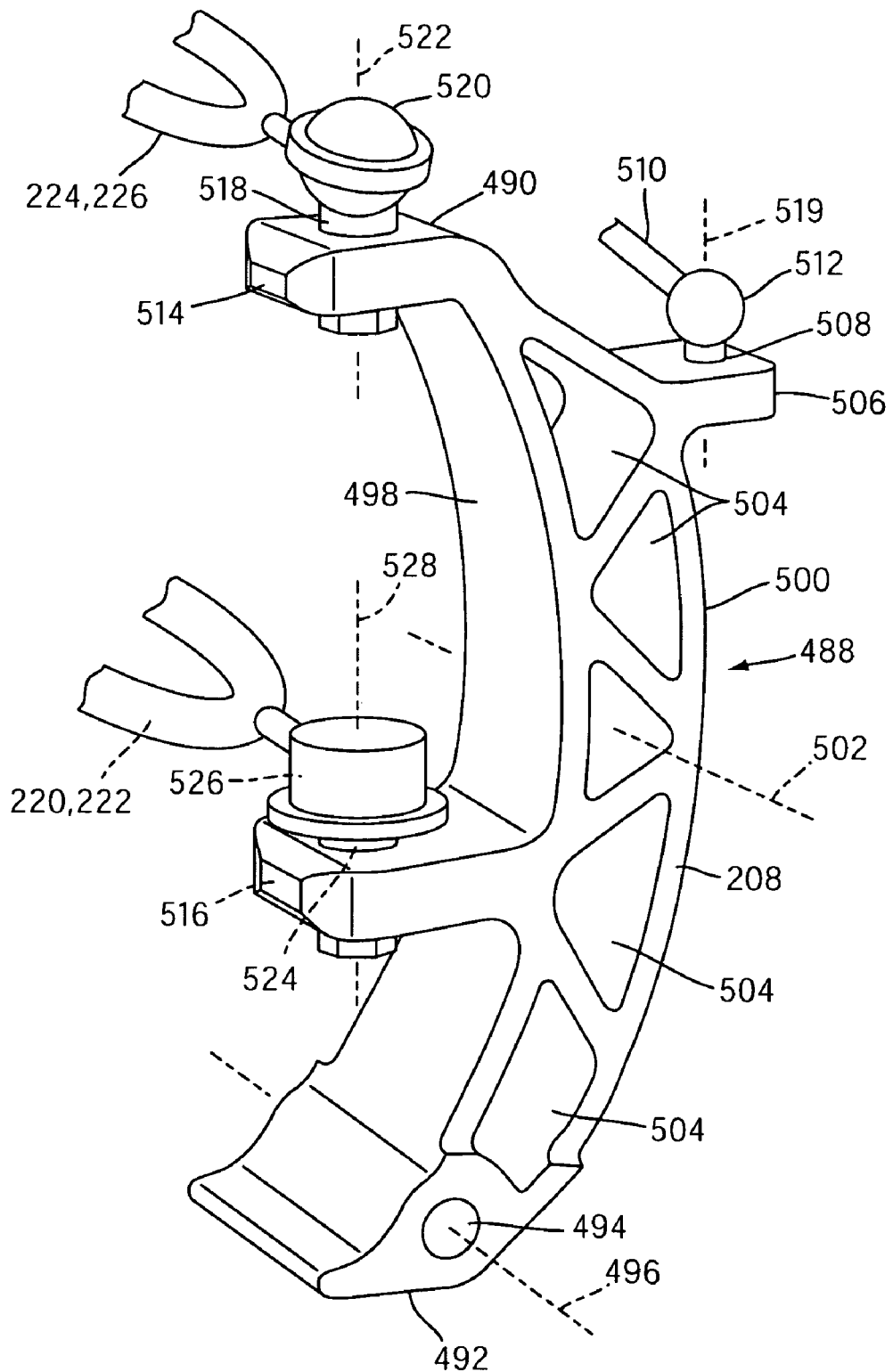
FIG. 41 is a perspective illustration of a portion of the three-ball joint front suspension of the present invention, illustrating the locations of the ball joints in connection with a front leg of the recreational vehicle of the present invention.

FIG. 41 illustrates the basic construction of a portion of front suspension 110 of the present invention.

FIG. 41 depicts leg 208 (or, alternatively, leg 210). Leg 208 has an essentially C-shaped body 488 with a top 490 and bottom 492. In the case of the inclusion of front suspension 110 on snowmobile 22, ski 108 is pivotally attached to leg 208 at its bottom 492 through a bolt or pin extending through hole 494. This pivotal connection is described above as pivot joint 112. As would be understood by those skilled in the art, however, any pivotal connection may be employed so long as ski 108 is permitted to pivot about an axis 496 defined by hole 494 through leg 208. Leg 208 includes a front side 498 and a rear side 500, which are defined according to the normal travel direction of snowmobile 22.

In the preferred embodiment of the present invention, leg 208 is constructed of aluminum, which offers a light-weight construction while providing significant strength for the component. Leg 208 is preferably an extrusion that has been extruded along an extrusion axis 502. Alternatively, leg 208 might be squeeze cast from aluminum. Whether extruded or squeeze cast, leg 208 offers the strength and rigidity needed to withstand the forces applied thereto as snowmobile 22 travels over uneven terrain. As would be understood by those skilled in the art, however, leg 208 may be constructed from any other suitable material or made according to a different construction technique so long as leg 208 exhibits the requisite strength and rigidity. Aluminum is preferred for the construction of leg 208 because aluminum is considerably lighter in weight than other materials such as steel. In addition, since leg 208 will be exposed to a wet environment (e.g., snow and ice), aluminum also offers the additional benefit that it is more resistant to oxidation than other materials such as steel.

While developing the present invention, the inventors recognized that leg 208 cannot be made from sand-cast aluminum, because the resulting crystallographic structure of leg 208 does not provide sufficient strength to withstand the forces applied thereto during normal operation of snowmobile 22. Despite this, leg 208 might be sand cast from other materials or potentially from an alloy of aluminum that might be sufficiently strong for use with the present invention.

Figure 42:
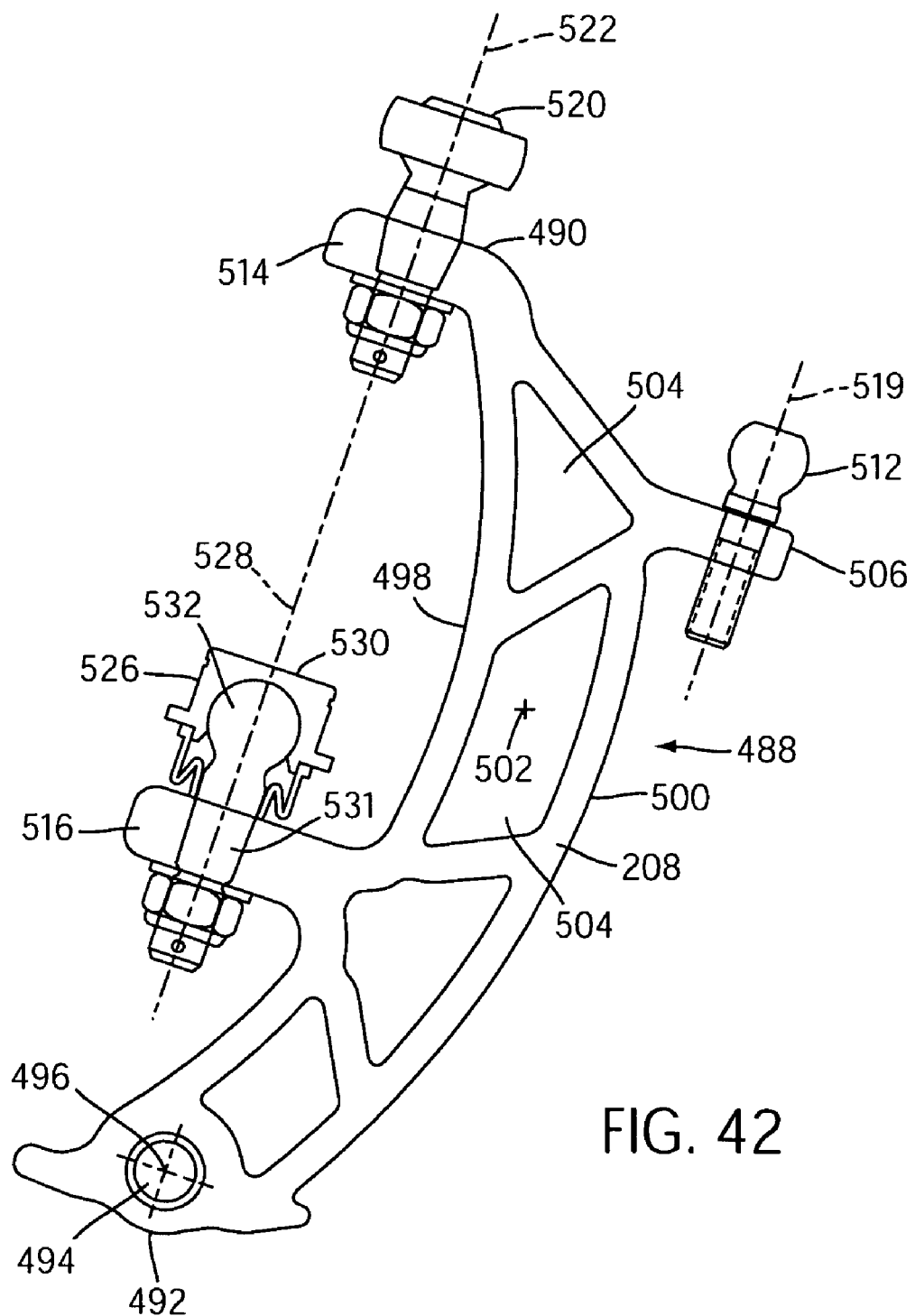
FIG. 42 is a side view illustration of the three-ball joint suspension illustrated in FIG. 41.
Figure 43:
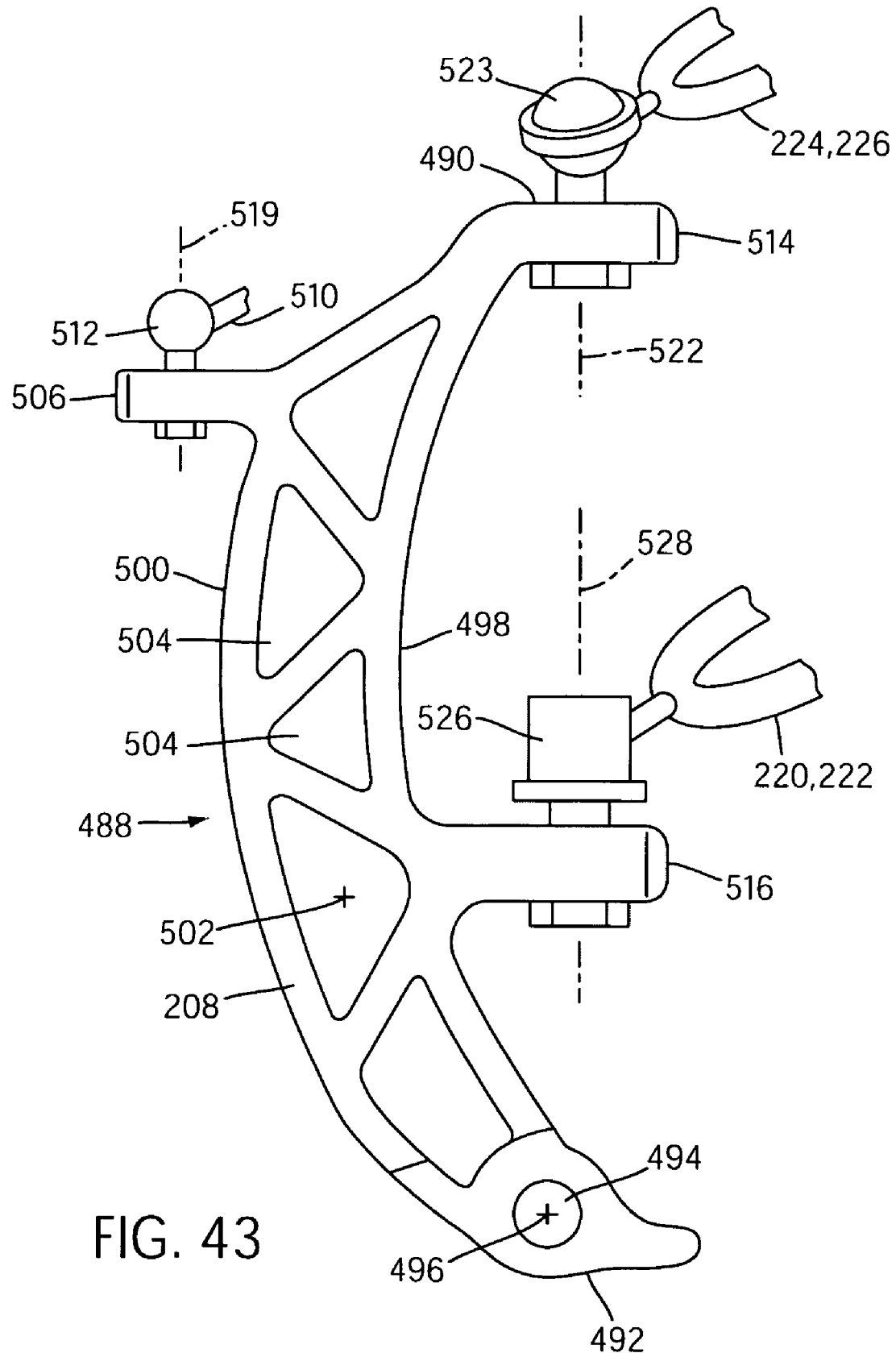
FIG. 43 is another side view illustration of the three-ball joint suspension illustrated in FIG. 41.

As illustrated in FIGS. 41–43, leg 208 preferably has a waffle-like construction. Specifically, leg 208 includes a number of holes 504 therethrough. The exact placement and shape of holes 504 are not critical to practice the present invention. However, there are two benefits of holes 504 in the manufacture of leg 208. First, holes 504 reduce the overall weight of leg 208. Second, when leg 208 is produced as an extrusion, holes 504 assist in the proper formation of leg 208. It is well known in the extrusion art that the thickness of any part of the extrusion should not exceed more than about two times the thickness of any other part. When the various parts of the extrusion are kept within this thickness limitation, the extrusion will form properly as it extrudes from the die on the extrusion machine.

Alternatively, leg 208 may be formed by another process in which holes 504 do not extend completely therethrough. Instead, holes 504 may extend only part of the way through leg 208. If a wall of material remains in leg 208, it may provide additional strength and rigidity to leg 208. Of course, any additional material added to leg 208 will also increase its overall weight.

Leg 208 includes a first extension portion 506 projecting from rear side 500. First extension portion 506 provides a platform through which hole 508 may be drilled. Mechanical linkage 510 connects to leg 208 at hole 508 through first extension portion 506. Mechanical linkage 510 connects to a first ball joint 512, and thereon to leg 208, so that leg 208 may rotate with respect to mechanical linkage 510 around first axis 519.

On front side 498, leg 208 includes a second extension portion 514 and a third extension portion 516. Second extension portion 514 provides a platform through which hole 518 may be drilled. Upper A-arm 224, 226 connects to leg 208 at hole 518 through second extension portion 514. Preferably, second extension portion 514 is situated at an intermediate position between the first extension portion 506 and third extension portion 516. Upper A-arm 224, 226 connects to a second ball joint 520, and thereon to leg 208, so that leg 208 may rotate with respect to upper A-arm 224, 226 around a second axis 522. Third extension portion 516 provides a platform through which hole 524 may be drilled. Lower A-arm 220, 222 connects to leg 208 at hole 524 through third extension portion 516. Lower A-arm 220, 222 connects to a third ball joint 526, and thereon to leg 208, so that leg 208 may rotate with respect to lower A-arm 220, 222 around a third axis 528.

To practice the present invention, first ball joint 512, second ball joint 520, and third ball joint 526 may be any suitable ball joint known to those skilled in the art. All that is required is that the three ball joints 512, 520, 526 be capable of permitting leg 208 to rotate even when high forces are applied thereto during operation of snowmobile 22.

In the preferred embodiment of the present invention (which is illustrated in FIG. 42), third ball joint 526 is preferably manufactured with a ball bearing construction, such as that made by THK of Japan. The preferred ball joint is made by molding a zinc housing 530 around a steel ball bearing 532 that is connected to a shaft 531. After zinc housing 530 is molded around steel ball bearing 532, the bond between zinc housing 530 and steel ball bearing 532 is broken mechanically. The end result is a ball joint with an extremely well-shaped central ball. Such a construction offers a suitable ball joint for the present invention because significant pressure, both from the weight of snowmobile 22 and from the forces exerted on the joint during operation of snowmobile 22, are exerted on the ball joint. If the ball within the joint is not smooth or very round, the joint may have a tendency to stick when significant forces are exerted thereon. This may impede steering of snowmobile 22 under certain conditions, which, while not fatal to the operation of snowmobile 22, may have an impact on the overall performance of snowmobile 22.

It is preferred that third ball joint 526 have a ball bearing construction because third ball bearing 526 is subjected to much higher forces than first ball joint 512 or second ball joint 520. Those skilled in the art, however, will readily appreciate that any suitable ball joint may be used for third ball joint 526 and that the ball joint manufactured by THK is not required to practice the present invention.

As may be appreciated from FIGS. 41–43, in the preferred embodiment of the present invention, second and third axes 522, 528 are co-axial with one another. However, this is not required to practice the present invention. It is contemplated that second axis 522 may be offset from third axis 528. Similarly, in the preferred embodiment of the present invention, while first, second and third axes 519, 522, 528 are shown parallel to one another, it is contemplated that the three axes 519, 522, 528 may be angled with respect to one another.

To steer snowmobile 22, handlebars 116 are connected to mechanical linkage 510. Rotation of handlebars 116 causes mechanical linkage 510 to exert force on first ball joint 512 to rotate leg 208 about an axis (shown as second and third axes 522, 528). As leg 208 rotates, so does ski 108 attached to bottom 492 thereof. The axis is angled with respect to vertical from about 10°–30°, more preferably from 15°–25°, and most preferably 20°.

As the foregoing discussion makes clear, the present invention solves one of the problems with the prior art. Namely, the construction of front suspension 110 provides a single leg 208 connected to an upper A-arm 224, 226 and a lower A-arm 220, 222. The three ball joints 512, 520, 526 permit leg 208 to rotate about axis 522, 528. In this manner, a trailing arm 444 is not required for additional stability. Moreover, a complex and heavy arrangement for the leg is not required, as in the Arctic Cat example. Accordingly, the present invention offers a simple, light-weight construction for front suspension 110 of snowmobile 22.

Similarly, the construction of front suspension 110 may be applied equally to a recreational vehicle such as wheeled vehicles 332, 356. However, in the case of wheeled vehicles 332, 356, leg 208 is replaced by wheel knuckles 366, 368 to which wheels 334 are rotatably attached. Since they act as supports for the skis 108 or wheels 334, or possibly for any other ground engaging element to which they are connected, legs 208, 210 and wheel knuckles 366, 368 may be referred to generically as "supports."

The design of leg 208 of the present invention offers at least one further advantage over the prior art. First, second, and third extension portions 506, 514, 516 extend a sufficient distance from C-shaped body 488 of leg 208 that the bolts or fasteners holding first, second, and third ball joints 512, 520, 526 in place are easily accessible. This facilitates replacement of one or more of the ball joints 512, 520, 526 or of the leg 208, should the replacement of any of these components become necessary. In addition, the leg 208 contacts the lower A-arm 220, 222 to prevent over rotation of the leg 208 which may occur when the snowmobile is stuck and a ski is pulled on to release the snowmobile. Over rotation of the leg 208 may damage the steering shaft. The leg 208 may also be locked to either the lower A-arm 220, 222 to prevent steering of the snowmobile to deter theft.

While the invention has been described by way of example embodiments, it is understood that the words which have been used herein are words of description, rather than words of limitation. Changes may be made, within the purview of the appended claims without departing from the scope and the spirit of the invention in its broader aspects. Although the invention has been described herein with reference to particular structures, materials, and embodiments, it is understood that the invention is not limited to the particulars disclosed.

What is claimed is:

1. A snowmobile comprising:
a frame including a tunnel;
an engine disposed on the frame;
a drive track disposed below and supported by the tunnel and operatively connected to the engine for propulsion of the snowmobile;
a front suspension including
    (a) at least two A-arms pivotally connected to the frame,
    (b) a ski leg rotatably connected with a ski, the ski leg comprising:
        a C-shaped elongated body having a concave side and a convex side, and
        a first protrusion projecting from the concave side, the first protrusion moveably connected to one of the at least two A-arms,
        a second protrusion projecting from the concave side, the second protrusion moveably connected to the other of the at least two A-arms, and
        a third protrusion projecting from a side other than the concave side of the C-shaped elongated body.

2. The snowmobile of claim 1, wherein each of the first and second protrusions further include a ball joint, the A-arms moveably connected to the first and second protrusions through the ball joints, the ball joints defining an axis of rotation of the ski leg passing through the first protrusion and the second protrusion.

3. The snowmobile of claim 1, wherein said first and second protrusions are integral with said ski leg and said ski leg is an aluminum extrusion having a direction of extrusion perpendicular to a forward direction of travel of the snowmobile.

4. The snowmobile of claim 1, wherein said first and second protrusions are integral with said ski leg and said ski leg is an aluminum extrusion having a direction of extrusion perpendicular to one of the first protrusion and the second protrusion.

5. The snowmobile of claim 1, wherein said ski leg further comprises at least one hole passing therethrough.

6. The snowmobile of claim 2, wherein said axis is 100 to 300 from vertical.

7. The snowmobile of claim 6, wherein said axis is 150 to 25° from vertical.

8. The snowmobile of claim 7, wherein said axis is 20° from vertical.

9. The snowmobile of claim 1, wherein the concave side of said C-shaped elongated body is a front side thereof defined by a forward direction of the snowmobile and the convex side of said C-shaped elongated body is a rear side thereof defined by a rearward direction of the snowmobile.

10. The snowmobile of claim 1, wherein the third protrusion projects from the C-shaped ski leg such that said third protrusion is parallel to the first and second protrusions.

11. The snowmobile of claim 1, further comprising a steering system, the third protrusion being moveably connected to the steering system.

* * * * *